(12) United States Patent
Schoenberg et al.

(10) Patent No.: US 11,030,264 B2
(45) Date of Patent: Jun. 8, 2021

(54) SYSTEMS AND METHODS FOR MATCHING A QUERY

(71) Applicant: Superfy Technologies Ltd., Tel Aviv (IL)

(72) Inventors: Gil Henry Schoenberg, Tel Aviv (IL); Michal Schoenberg Tamir, Tel Aviv (IL); Nadav Rajuan, Netanya (IL); Or Rajuan, Even-Yehuda (IL)

(73) Assignee: Superfy Technologies Ltd., Tel Aviv (IL)

( * ) Notice: Subject to any disclaimer, the term of this patent is extended or adjusted under 35 U.S.C. 154(b) by 173 days.

(21) Appl. No.: 16/236,530

(22) Filed: Dec. 30, 2018

(65) Prior Publication Data

US 2020/0210506 A1  Jul. 2, 2020

(51) Int. Cl.
| | | |
|---|---|---|
| *G06F 16/9536* | (2019.01) | |
| *G06F 16/9535* | (2019.01) | |
| *G06F 16/2457* | (2019.01) | |
| *H04L 29/06* | (2006.01) | |
| *G06F 16/23* | (2019.01) | |
| *H04L 29/08* | (2006.01) | |

(52) U.S. Cl.
CPC ...... *G06F 16/9536* (2019.01); *G06F 16/2379* (2019.01); *G06F 16/24578* (2019.01); *G06F 16/9535* (2019.01); *H04L 63/08* (2013.01); *H04L 65/1069* (2013.01); *H04L 67/12* (2013.01)

(58) Field of Classification Search
CPC ........... G06F 16/2379; G06F 16/24578; G06F 16/9535; G06F 16/9536; H04L 63/08; H04L 65/1069; H04L 67/12; G06Q 10/107; G06Q 50/01
See application file for complete search history.

(56) References Cited

U.S. PATENT DOCUMENTS

| | | | | |
|---|---|---|---|---|
| 10,459,997 | B1* | 10/2019 | Agarwal | G06F 16/9535 |
| 2014/0074856 | A1* | 3/2014 | Rao | G06Q 50/01 |
| | | | | 707/748 |
| 2014/0082101 | A1* | 3/2014 | Wable | H04L 65/403 |
| | | | | 709/206 |
| 2016/0034466 | A1* | 2/2016 | Sinha | H04L 67/306 |
| | | | | 707/732 |
| 2019/0155916 | A1* | 5/2019 | Huang | G06F 16/248 |

* cited by examiner

*Primary Examiner* — Irete F Ehichioya
*Assistant Examiner* — Xiaoqin Hu

(57) ABSTRACT

There is provided a method of setting up an interactive communication session between a querying client terminal and target client terminal(s), comprising: receiving a query from the querying client terminal, semantically matching the query to a structured dataset storing structured data created from unstructured user generated content, and unstructured user reactions, extracted from posted profiles of user credentials of a social network, selecting matched user credentials of users of the social network according to an analysis of the matched structured data, distributing a request for joining an interactive communication session to matched client terminals of the matched user credentials, receiving at least one response to the request from responding client terminal(s) of at least one responding user credentials, and establishing an interactive communication session between the querying client terminal and the responding client terminal(s) of the at least one responding user credentials.

36 Claims, 18 Drawing Sheets

FIG. 5    502

| | | | | | | | |
|---|---|---|---|---|---|---|---|
| 14 hours ago | Who likes Stranger Things? | ▤▊ | | 2/6/143/163 | | 16501 | |

QuestionRecivers

| Name | Reason | Seen | Response Time | Messages | SuperLike | is_Read | Chat ID | |
|---|---|---|---|---|---|---|---|---|
| | Match | ✓✓ | | | | | 720397 | ← 604 |
| | Match | | | | | | 720312 | |
| | Match | | | | | | 720303 | |
| | Match | | | | | | 720370 | |
| | Match | | | | | | 720364 | |
| | Match | | | | | | 720375 | |
| | Match | | | | | | 720340 | |

| id | word | chars | count |
|---|---|---|---|
| 1 | Heathers | 0 | 414 |
| 2 | Premieres | 0 | 230 |
| 3 | in | 0 | 116085 |
| 4 | 2018 | 0 | 2540 |
| 5 | on | 0 | 130711 |
| 6 | the | 0 | 447985 |
| 7 | Paramount | 0 | 104 |
| 8 | Network | 0 | 5266 |
| 9 | Ugo | 0 | 12 |
| 10 | Okere | 0 | 1 |
| 11 | Organizer | 0 | 27 |
| 12 | Immigrant | 0 | 12 |
| 13 | Millennial | 0 | 49 |
| 14 | and | 0 | 329278 |
| 15 | candidate | 0 | 111 |
| 16 | for | 0 | 146945 |

1302

Who is the best guitar player? ← 1602

| who | is | the | best | guitar | player |
|---|---|---|---|---|---|
| 3342 | 281566 | 864415 | 46429 | 1167 | 886 |
| 23.99 | 8.22 | 0 | 21.53 | 58.72 | 100 |
|  | 286 | 3455 | 5276 | 2 | 10 |
|  | 116.87 | 81.5 | 8.8 | 583.5 | 88.6 |

← 1604 who is the best guitar player ← 1606

Gil Lewis - 18.283085
Johannes Hopfner - 16.428444
Guitar Flash Mobile - GFM - 16.070395
BLACKOUT - 15.073898
Andy Matteo - 15.068829
Nili Fink | 14.970442 - נילי פינק
RamDam - 14.88771
Dante Phoenix - 14.88771
Guitar Player Magazine - 14.862198
Roy Lev-Ari - 13.390978

SYSTEMS AND METHODS FOR MATCHING A QUERY

BACKGROUND

The present invention, in some embodiments thereof, relates to processing of queries and, more specifically, but not exclusively, to systems and methods for matching a query submitted by a client terminal.

Traditionally, a user looking to find information on a certain topic enters a search query into a search engine. The search query performs a search on a large amount of data, for example, web pages stored on a node connected to the internet, and returns a list of data items determined by the search engine to be most relevant to the search query. The user may browse through the search results in an effort to identify the specific information the user is looking for.

SUMMARY

According to a first aspect, a method of setting up an interactive communication session between a querying client terminal and at least one target client terminal, comprises: receiving a query from the querying client terminal, semantically matching the query to a structured dataset storing structured data created from unstructured user generated content, and unstructured user reactions, extracted from posted profiles of user credentials of a social network, selecting a plurality of matched user credentials of users of the social network according to an analysis of the matched structured data, distributing a request for joining an interactive communication session to a plurality of matched client terminals of the plurality of matched user credentials, receiving at least one response to the request from at least one responding client terminal of at least one responding user credentials, and establishing an interactive communication session between the querying client terminal and the at least one responding client terminal of the at least one responding user credentials.

According to a second aspect, a system for setting up an interactive communication session between a querying client terminal and at least one target client terminal, comprises: at least one hardware processor, and a non-transitory memory having stored thereon a code for execution by the at least one hardware processor, the code comprising instructions for: receiving a query from the querying client terminal, semantically matching the query to a structured dataset storing structured data created from unstructured user generated content, and unstructured user reactions, extracted from posted profiles of user credentials of a social network, selecting a plurality of matched user credentials of users of the social network according to an analysis of the matched structured data, distributing a request for joining an interactive communication to a plurality of matched client terminals of the plurality of matched user credentials, receiving at least one response to the request from at least one responding client terminal of at least one responding user credentials, and establishing an interactive communication session between the querying client terminal and the at least one responding client terminal of the at least one responding user credentials.

According to a third aspect, a computer program product for setting up an interactive communication session between a querying client terminal and at least one target client terminal, comprises: a non-transitory memory having stored thereon a code for execution by at least one hardware processor, the code comprising instructions for: receiving a query from the querying client terminal, semantically matching the query to a structured dataset storing structured data created from unstructured user generated content, and unstructured user reactions, extracted from posted profiles of user credentials of a social network, selecting a plurality of matched user credentials of users of the social network according to an analysis of the matched structured data, distributing a request for joining an interactive communication session to a plurality of matched client terminals of the plurality of matched user credentials, receiving at least one response to the request from at least one responding client terminal of at least one responding user credentials, and establishing an interactive communication session between the querying client terminal and the at least one responding client terminal of the at least one responding user credentials.

At least some of the systems, apparatus, methods, and/or code instructions described herein provide a new user experience for a user searching for data according to a query. In contrast to existing processes that simply return search results and/or return a list of possibly matching content, at least some of the systems, apparatus, methods, and/or code instructions described herein establish an interactive communication session between the client terminal of the user that provided the query and a client terminal(s) of users considered as experts for answering the query.

At least some of the systems, apparatus, methods, and/or code instructions described herein improve the technology of search engines that search for a query. Such traditional search engines are limited, for example, for searching for data in a certain domain based on queries within the domain (e.g., based on domain specific keywords), and/or for returning a relatively large amount of results, many of which are irrelevant to the query. In such cases, the user may need to re-word the query and re-enter the query, and/or sort through the results to find the answer to the query. The improvement provided by at least some of the systems, apparatus, methods, and/or code instructions described herein is based on matching the query to user credentials using the structured dataset storing structured data created from unstructured data extracted from profiles of users of a social network. An interactive communication session is established to link the querying user with the matched user credentials. The search results of the query are provided by the matched user credentials via the interactive communication session, which may provide the querying user with an immediate answer to the query. Moreover, the query is not limited to a certain domain, and can include any domain, any topic, since the keywords are created according to an analysis of the unstructured data of the social network, and not according to a predefined dictionary.

At least some of the systems, apparatus, methods, and/or code instructions described herein relate to the technical problem of identifying an expert user in a social network able to provide expert advice for a query, such as a question. A social network is made up of unstructured user profiles that are linked to one another in an unstructured manner. A user looking to identify an expert in a certain area, within the social network, may attempt to perform a search for users, and/or manually ask other users who they consider the expert. However, the unstructured nature of the data of the social network makes such searches tedious, time consuming, and unreliable in terms of finding the real expert. For example, querying users may be incorrectly drawn to well designed commercial webpages, influenced by other users that have a personal bias towards certain other users, and/or may entirely miss users that are difficult to find due to the unstructured nature of the data of the social network.

At least some of the systems, apparatus, methods, and/or code instructions described herein address a technical problem that is unique to the technological context of social networks that store unstructured user profiles, that only recently arose due to improvements in network technology and does not have a long standing counterpart in the physical world. The technical problem described herein is relatively new, and recently arose due to the wide adoption of social networks by many users. Such social networks, in which users may create their own user profiles, post their own content, create their own links to other content and/or network document, and/or provide reactions to other content and/or network documents, is a new technology that arose from the technology of networks (e.g., the internet) and has no long standing counterpart in the real physical world. The technical solution provided by at least some of the systems, apparatus, methods, and/or code instructions described herein is addressed by a specific technological context of a social network storing unstructured data hosted by a network connected computing device(s).

At least some of the systems, apparatus, methods, and/or code instructions described herein relate to the technical problem of retrieving search results for a search query. Using standard existing methods, a user looking for certain data, such as an answer to a certain question, enters a query into a search engine, optionally an internet search engine. The internet search engine is dependent on data that is found online, for example, textual information stored on websites. The search engine cannot access information regarding topics that are stored in the minds of users, for example, that are experts in the topics related to the query. The search engine usually returns a large number of search results to the user, for example, web sites and/or other content. The user manually examines the search results to try to determine the most relevant results. The most relevant results are further manually examined by the user in an attempt to obtain an answer to the query. Such existing search engines place a time consuming burden on the user to manually examine the search results in an attempt to find an answer to a question.

At least some of the systems, apparatus, methods, and/or code instructions described herein provide a uniquely designed and structured graphical user interface paired with prescribed functionality directly related to the graphical user interface's structure that is addressed to and resolves the technical problem described herein. As described, the GUI includes a field for a user to enter a query, includes code for interacting with a computing device to search through structured data created from unstructured data extracted from posted profiles of users of a social network to identify candidate user credentials, and includes code for establishing an interactive communication session (e.g., chat) between the querying client terminal of the querying user and client terminal(s) of responding users. The GUI is especially designed to be executed on mobile devices with small screens, in which the user may easily enter the query into the GUI and easily interact with responding users via the GUI. The GUI described herein is especially easy to navigate and use on small screens of mobile devices in contrast to traditional search engines that return a large number of search results, where the user is required to open up the search results to determine whether the identified content is actually relevant to the query or not, which is difficult to perform on small screens.

At least some of the systems, apparatus, methods, and/or code instructions described herein improve the functioning of a computer by enabling a user to more quickly communicate with a user considered an expert in answering a query of the user by a process for first finding the expert user, and then establishing an interactive communication session between the querying user and the expert user. The user may use the interactive communication session to directly communicate with the expert user in order to gain a specific and satisfactory answer to the query.

At least some of the systems, apparatus, methods, and/or code instructions described herein provide an improved user interface for computer devices that implements a particular manner of establishing an interactive communication session with an expert user in response to a client query, based on an analysis of structured data created from unstructured data extracted from postings on user profiles of a social network. The user interface described herein provides a faster and easier process for accessing information semantically matching a search query than conventional navigation approaches and/or conventional search engines, in particular for devices with small screens. At least some of the systems, apparatus, methods, and/or code instructions described herein provide easier, more efficient access to obtain an answer to a query using fewer steps.

At least some implementations of the systems, apparatus, methods, and/or code instructions described herein provide an objective, reproducible process for scoring users according to a query. The process creates structured data from unstructured postings of user profiles of a social network, which is used to compute objective and reproducible scores for users according to the query. The users with highest scores represent users that are considered as experts in terms of being most likely to provide the most accurate answer to the query.

At least some implementations of the systems, apparatus, methods, and/or code instructions described herein improve the computational efficiency of a computing device that searches through data according to a query and/or improve the accuracy and/or quality of the search results obtained by using the query to perform a search. The improvement in computational efficiency arises at least from the structured data which is created from unstructured data extracted from user profiles of a social network, in comparison to searching through the unstructured data itself. The structured data may enrich existing content (e.g., stored in the social network) and/or create new data that didn't exist prior (e.g., interest, category, scores, as described herein), enabling finding information within the data that would not otherwise have been found, for example, using standard search engine processes. In addition, structuring the unstructured data clears or significantly reduces noise (e.g., irrelevant data), which may result in relatively more accurate result, for example, in comparison to standard search processes. Exemplary improvements in computational efficiency include: a reduction in processing time for searching through the structured data rather than unstructured data, an improvement in utilization of available computational hardware (e.g., processors) to search through the structured data, and improvement in utilization of available data storage devices (e.g., memory) for searching through the structured data rather than unstructured data.

In a further implementation form of the first, second, and third aspects, a plurality of responses to the request is received from a corresponding plurality of responding client terminals, wherein establishing comprises establishing a single interactive communication session between the plurality of responding client terminals and the querying client terminal.

In a further implementation form of the first, second, and third aspects, a plurality of responses to the request is received from a corresponding plurality of responding client terminals, wherein establishing comprising establishing a plurality of one-on-one interactive communication sessions, each between the querying client terminal and one of the plurality of responding client terminals.

In a further implementation form of the first, second, and third aspects, the method further comprises and/or the system further comprises code for and/or the computer program product further comprises code instructions for creating a group interactive session by adding the at least one responding client terminal and the querying client terminal as participants to the group interactive session.

In a further implementation form of the first, second, and third aspects, the method further comprises and/or the system further comprises code for and/or the computer program product further comprises code instructions for identifying an existing group interactive session having the at least one responding client terminal as a participant thereof, and establishing the interactive session comprises adding the querying client terminal as a participant of the existing group interactive session.

In a further implementation form of the first, second, and third aspects, no social relationships exist in the social network between query user credentials associated with the query and the at least one responding user credentials.

In a further implementation form of the first, second, and third aspects, the structured dataset stores an indication of each respective user that generated each unstructured user generated content.

In a further implementation form of the first, second, and third aspects, the method further comprises and/or the system further comprises code for and/or the computer program product further comprises code instructions for updating the structured dataset with structured data created from unstructured user generated content posted by the querying client terminal and the at least one responding user credentials to the interactive communication session.

In a further implementation form of the first, second, and third aspects, the query is associated with querying user credentials, and further comprising updating the structured dataset with structured data created from unstructured content generated by the querying user credentials, and unstructured reactions of the querying user credentials, extracted from at least one posted profile of the querying user credential of the social network.

In a further implementation form of the first, second, and third aspects, the method further comprises and/or the system further comprises code for and/or the computer program product further comprises code instructions for updating the structured dataset with structured data created from an analysis of interactions of the querying client terminal and the at least one responding user credentials with the interactive communication session.

In a further implementation form of the first, second, and third aspects, the analysis of the interactions include: number of posts during the interactive communication session, number of words posted during the interactive communication session, number of interactive communication sessions in which the respective user credentials participated in, total time spent participating in the interactive communication session, and a reaction by the querying client terminal to the at least one responding user credentials indicative of response to the query.

In a further implementation form of the first, second, and third aspects, the unstructured user reactions include one or more members selected from the group consisting of: a reaction of a certain user to a network document associated with reactions by a plurality of users, a reaction of the certain user to a content object generated by another user, and a reaction of another user to at least one of a network document of the certain user and a content object generated by the certain user.

In a further implementation form of the first, second, and third aspects, the method further comprises and/or the system further comprises code for and/or the computer program product further comprises code instructions for analyzing the query to select at least one keyword based on an analysis of computed word scores assigned to each of a plurality of words of the query, wherein the word scores are assigned to each of the plurality of words of the query according to an analysis of a structured word index created from the unstructured user generated content, and wherein semantically matching comprises semantically matching the at least one keyword to the structured dataset.

In a further implementation form of the first, second, and third aspects, semantically matching comprises: searching indexed user generated content of the structured dataset with the at least one keyword to identify a plurality of matching structured indexed user generated content objects, wherein the structured indexed user generated content is created by indexing of the unstructured user generated content, wherein the plurality of matched user credentials are selected according to the plurality of matching structured indexed user generated content objects.

In a further implementation form of the first, second, and third aspects, the plurality of matched user credentials are selected by mapping the plurality of matching structured indexed user generated content objects to the matched of plurality of user credentials according to a mapping dataset of the structured dataset, wherein the mapping dataset is created according to an analysis of the unstructured user generated content, and the unstructured user reactions.

In a further implementation form of the first, second, and third aspects, the plurality of matched user credentials are selected according to a score computed for each of a plurality of candidate user credentials, the plurality of candidate user credentials are mapped to the plurality of matching structured indexed user generated content objects, where each score is indicative of correlation between the respective candidate user credentials and the at least one keyword, the score computed according to an analysis of the mapping dataset.

In a further implementation form of the first, second, and third aspects, the mapping dataset comprises a graph comprising nodes and edges connecting the nodes, wherein the nodes are indicative of at least one member selected from the group consisting of: indexed network document of user generated content objects, indexed user generated content objects, user credentials, and a category, wherein edges connecting the nodes are selected from the group consisting of: a link between user credentials and an indexed network document of user generated content objects, a link between user credentials and indexed user generated content objects, a link between an indexed network document of user generated content objects and a category, and user credentials and a category, wherein each indexed network document is linked to a plurality of user credentials, wherein each indexed user generated content object is linked to a single user credential, wherein unstructured user reactions are stored as weights of the edges.

In a further implementation form of the first, second, and third aspects, the plurality of matched user credentials are further selected according to a correlation score computed based on a correlation between a user profile of the querying user that provided the query and a user profile of each of the plurality of matched user credentials.

In a further implementation form of the first, second, and third aspects, the user profile includes one or more members selected from the group consisting of: demographic data, age, income, education level, geographical location, preferred time of day, and indication of relationships between a respective user and other users.

In a further implementation form of the first, second, and third aspects, the structured dataset includes a categorization of the unstructured user generated content into a plurality of categories, wherein each unstructured user generated content comprises a network document linked to user credentials via unstructured user reactions, each category of the plurality of categories being associated with a computed category uniqueness score indicative of uniqueness of the user credentials to the respective category and the uniqueness of the respective category relative to the plurality of categories.

In a further implementation form of the first, second, and third aspects, the analysis of the matched structured data for selecting the plurality of matched user credentials is according to the uniqueness score of the category of the matched structured data and according to a match with a category computed for the query.

In a further implementation form of the first, second, and third aspects, semantically matching comprises semantically matching words of the query to the structured dataset according to a standardization of terms of the unstructured user generated content.

In a further implementation form of the first, second, and third aspects, the standardization of terms of the unstructured user generated content comprises: generating a set of document-tokens matched to the unstructured user generated content, clustering the document-tokens into a plurality of clusters, selecting, for each respective cluster of the plurality of clusters, a single unstructured user generated content indicative as most representative of the members of the respective cluster, wherein a term of the selected single unstructured user generated content is designated as a standardized term, and wherein each member of each respective cluster is mapped to the corresponding standardized term of the respective cluster, and the semantically matching is performed by matching words of the query to standardized terms mapped to user generated content.

In a further implementation form of the first, second, and third aspects, the clusterization is performed based on non-supervised processes.

In a further implementation form of the first, second, and third aspects, the query is entered into a graphical user interface (GUI), and the interactions of the interactive communication session are presented within the GUI.

In a further implementation form of the first, second, and third aspects, the interactive communication session comprises a chat messaging session.

In a further implementation form of the first, second, and third aspects, the query is text manually entered by a user.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6 is a schematic depicting an example of response(s) received from matched user credentials to which a request for joining the interactive communication session has been distributed, in accordance with some embodiments of the present invention;

DETAILED DESCRIPTION

Figure 1:
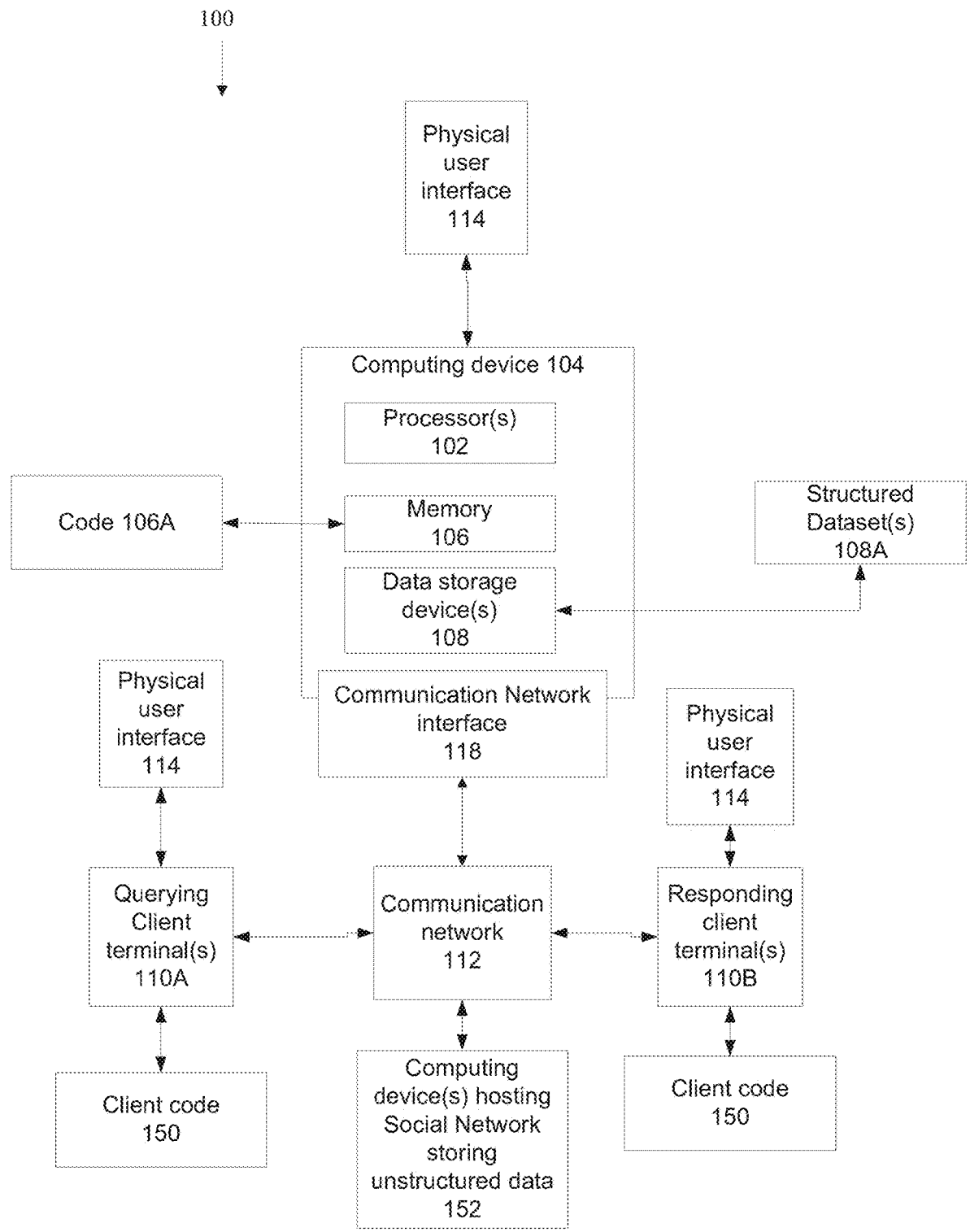
FIG. 1 is a block diagram of components of a system for setting up an interactive communication session between a querying client terminal and at least one responding client terminal identified based on a semantic match of a query to a structured dataset and/or for creating the structured dataset from unstructured data extracted from posted profiles of users of a social network, in accordance with some embodiments of the present invention.

The present invention, in some embodiments thereof, relates to processing of queries and, more specifically, but not exclusively, to systems and methods for matching a query submitted by a client terminal.

As used herein, the term network document is sometimes interchangeable with the term web document. It is noted that in some implementations the network document (and/or web document) may be stored and/or accessed on private networks, in addition to and/or instead of publicly accessible networks such as the internet.

An aspect of some embodiments of the present invention relates to systems, methods, an apparatus, and/or code instructions for setting up an interactive communication session between a querying client terminal and one or more target client terminals of responding user credentials matched to a query submitted by the querying client terminal. The query may be related to any topic. The query is semantically matched to a structured dataset storing structured data created from unstructured user generated content, and/or unstructured user reactions, extracted from posted profiles of users of a social network. The posted profiles may include network documents. Multiple matched user credentials of users of the social network are selected according to an analysis of the matched structured data. The matched user credentials represent the users determined by the analysis as the expert users with respect to the target query, for example, the users best able to answer questions associated with the query due to expressed proficiency related to the query. A request for joining an interactive communication session is distributed to the client terminals of the matched user credentials. One or more responses to the request are received from one or more responding client terminals of responding user credentials. The interactive communication session, for example, a text chat, a video chat, is established between the querying client terminal and the responding client terminals. The interactive communication session establishes a direct communication channel between the user that entered the query and one or more responding users that are computed as most likely to be able to answer the query and/or provide additional information associated with the query. The user may quickly gain the information they need from the responding users by asking questions directly to the expert user(s).

At least some of the systems, apparatus, methods, and/or code instructions described herein provide a new user experience for a user searching for data according to a query. In contrast to existing processes that simply return search results and/or return a list of possibly matching content, at least some of the systems, apparatus, methods, and/or code instructions described herein establish an interactive communication session between the client terminal of the user that provided the query and a client terminal(s) of user(s) considered as an expert(s) for answering the query.

At least some of the systems, apparatus, methods, and/or code instructions described herein improve the technology of search engines that search for a query. Such traditional search engines are limited, for example, for searching for data in a certain domain based on queries within the domain (e.g., based on domain specific keywords), and/or for returning a relatively large amount of results, many of which are irrelevant to the query. In such cases, the user may need to re-word the query and re-enter the query, and/or sort through the results to find the answer to the query. The improvement provided by at least some of the systems, apparatus, methods, and/or code instructions described herein is based on matching the query to user credentials using the structured dataset storing structured data created from unstructured data extracted from profiles of users of a social network. An interactive communication session is established to link the querying user with the matched user credentials. The search results of the query are provided by the matched user credentials via the interactive communication session, which may provide the querying user with an immediate answer to the query. Moreover, the query is not limited to a certain domain, and can include any domain, any topic, since the keywords are created according to an analysis of the unstructured data of the social network, and not according to a predefined dictionary.

At least some of the systems, apparatus, methods, and/or code instructions described herein relate to the technical problem of identifying an expert user in a social network able to provide expert advice for a query, such as a question. A social network is made up of unstructured user profiles that are linked to one another in an unstructured manner. A user looking to identify an expert in a certain area, within the social network, may attempt to perform a search for users, and/or manually ask other users who they consider the expert. However, the unstructured nature of the data of the social network makes such searches tedious, time consuming, and unreliable in terms of finding the real expert. For example, querying users may be incorrectly drawn to well designed commercial webpages, influenced by other users that have a personal bias towards certain other users, and/or may entirely miss users that are difficult to find due to the unstructured nature of the data of the social network.

At least some of the systems, apparatus, methods, and/or code instructions described herein address a technical problem that is unique to the technological context of social networks that store unstructured user profiles, that only recently arose due to improvements in network technology and does not have a long standing counterpart in the physical world. The technical problem described herein is relatively new, and recently arose due to the wide adoption of social networks by many users. Such social networks, in which users may create their own user profiles, post their own content, create their own links to other content and/or network document, and/or provide reactions to other content and/or network documents, is a new technology that arose from the technology of networks (e.g., the internet) and has no long standing counterpart in the real physical world. The technical solution provided by at least some of the systems, apparatus, methods, and/or code instructions described herein is addressed by a specific technological context of a social network storing unstructured data hosted by a network connected computing device(s).

At least some of the systems, apparatus, methods, and/or code instructions described herein relate to the technical problem of retrieving search results for a search query. Using standard existing methods, a user looking for certain data, such as an answer to a certain question, enters a query into a search engine, optionally an internet search engine. The internet search engine is dependent on data that is found online, for example, textual information stored on websites. The search engine cannot access information regarding topics that are stored in the minds of users, for example, that are experts in the topics related to the query. The search engine usually returns a large number of search results to the user, for example, web sites and/or other content. The user manually examines the search results to try to determine the most relevant results. The most relevant results are further manually examined by the user in an attempt to obtain an answer to the query. Such existing search engines place a time consuming burden on the user to manually examine the search results in an attempt to find an answer to a question.

At least some of the systems, apparatus, methods, and/or code instructions described herein provide a uniquely designed and structured graphical user interface paired with prescribed functionality directly related to the graphical user interface's structure that is addressed to and resolves the technical problem described herein. As described, the GUI includes a field for a user to enter a query, includes code for interacting with a computing device to search through structured data created from unstructured data extracted from posted profiles of users of a social network to identify candidate user credentials, and includes code for establishing an interactive communication session (e.g., chat) between the querying client terminal of the querying user and client terminal(s) of responding users. The GUI is especially designed to be executed on mobile devices with small screens, in which the user may easily enter the query into the GUI and easily interact with responding users via the GUI. The GUI described herein is especially easy to navigate and use on small screens of mobile devices in contrast to traditional search engines that return a large number of search results, where the user is required to open up the search results to determine whether the identified content is actually relevant to the query or not, which is difficult to perform on small screens.

At least some of the systems, apparatus, methods, and/or code instructions described herein improve the functioning of a computer by enabling a user to more quickly communicate with a user considered an expert in answering a query of the user by a process for first finding the expert user, and then establishing an interactive communication session between the querying user and the expert user. The user may use the interactive communication session to directly communicate with the expert user in order to gain a specific and satisfactory answer to the query.

At least some of the systems, apparatus, methods, and/or code instructions described herein provide an improved user interface for computer devices that implements a particular manner of establishing an interactive communication session with an expert user in response to a client query, based on an analysis of structured data created from unstructured data extracted from postings on user profiles of a social network. The user interface described herein provides a faster and easier process for accessing information seman-tically matching a search query than conventional navigation approaches and/or conventional search engines, in particular for devices with small screens. At least some of the systems, apparatus, methods, and/or code instructions described herein provide easier, more efficient access to obtain an answer to a query using fewer steps.

At least some implementations of the systems, apparatus, methods, and/or code instructions described herein provide an objective, reproducible process for scoring users according to a query. The process creates structured data from unstructured postings of user profiles of a social network, which is used to compute objective and reproducible scores for users according to the query. The users with highest scores represent users that are considered as experts in terms of being most likely to provide the most accurate answer to the query.

At least some implementations of the systems, apparatus, methods, and/or code instructions described herein improve the computational efficiency of a computing device that searches through data according to a query and/or improve the accuracy and/or quality of the search results obtained by using the query to perform a search. The improvement in computational efficiency arises at least from the structured data which is created from unstructured data extracted from user profiles of a social network, in comparison to searching through the unstructured data itself. The unstructured data may enrich existing content (e.g., stored in the social network) and/or create new data that didn't exist prior (e.g., interest, category, scores, as described herein), enabling finding information within the data that would not otherwise have been found, for example, using standard search engine processes. In addition, structuring the unstructured data clears or significantly reduces noise (e.g., irrelevant data), which may result in relatively more accurate result, for example, in comparison to standard search processes. Exemplary improvements in computational efficiency include: a reduction in processing time for searching through the structured data rather than unstructured data, an improvement in utilization of available computational hardware (e.g., processors) to search through the structured data, and improvement in utilization of available data storage devices (e.g., memory) for searching through the structured data rather than unstructured data.

At least some implementations of the systems, apparatus, methods, and/or code instructions described herein improve the technical field of search engines that perform a data search using a query.

At least some implementations of the systems, apparatus, methods, and/or code instructions described herein improve the technical field of GUIs designed for small screens, for improving the user experience of searching through data according to a query.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
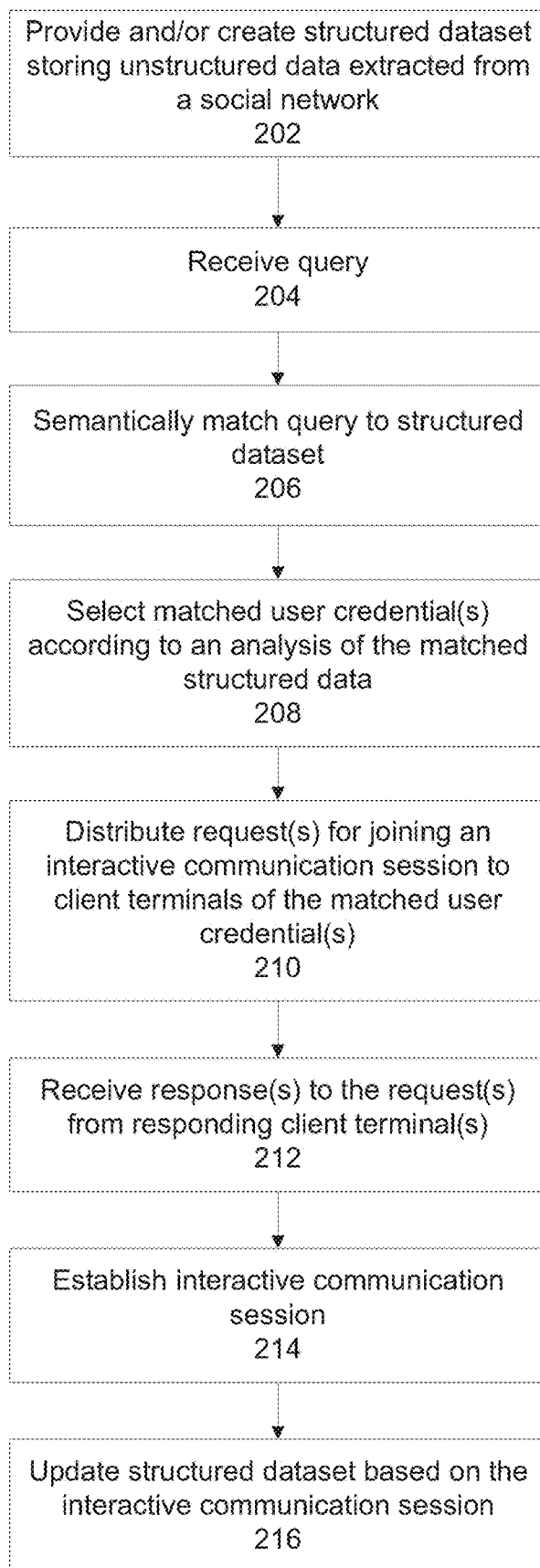
FIG. 2 is a flowchart of a method of setting up an interactive communication session between a querying client terminal and at least one responding client terminal identified based on a semantic match of a query to a structured dataset, in accordance with some embodiments of the present invention.
Figure 3:
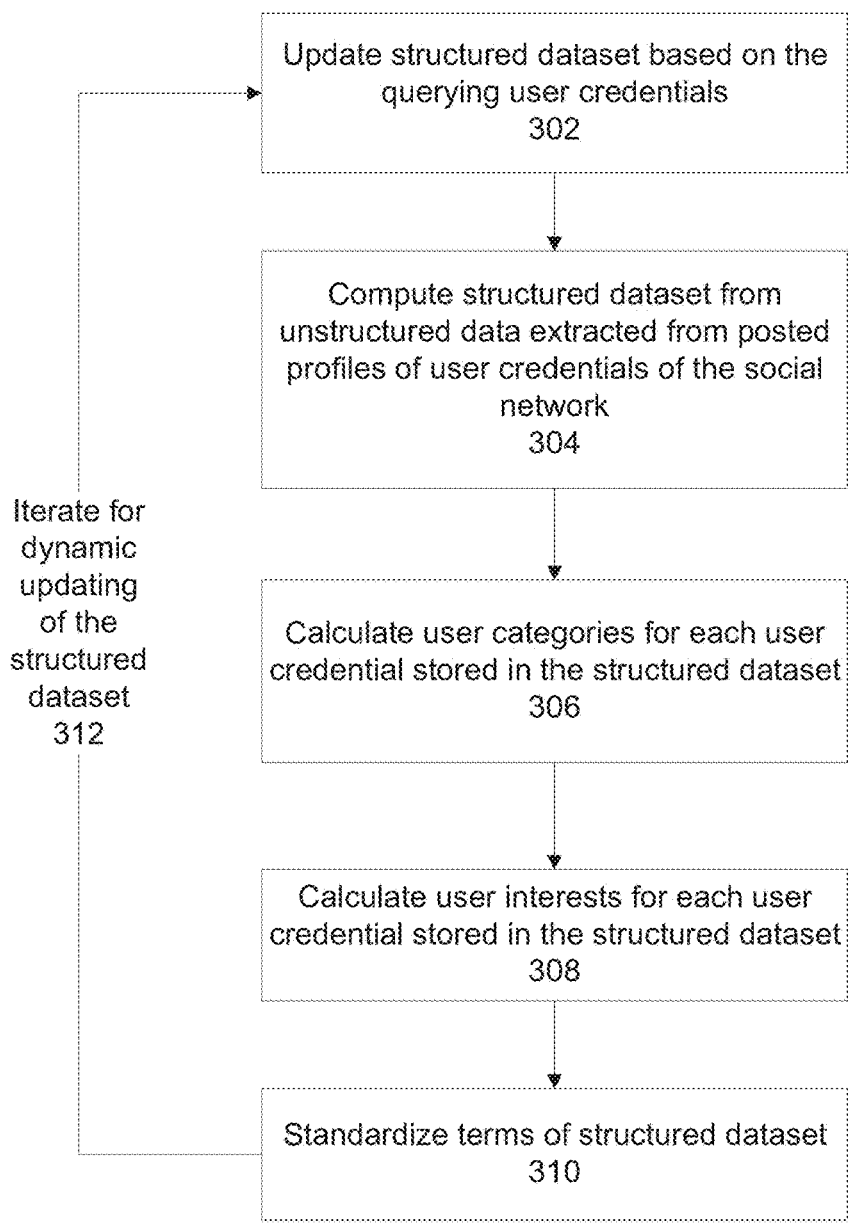
FIG. 3 is a flowchart of an exemplary method for computing a structured dataset storing structured data created from unstructured data extracted from posted profiles of users of a social network, in accordance with some embodiments of the present invention.

Reference is now made to FIG. 1, which is a block diagram of components of a system 100 for setting up an interactive communication session between a querying client terminal and at least one responding client terminal identified based on a semantic match of a query to a structured dataset and/or for creating the structured dataset from unstructured data extracted from posted profiles of users of a social network, in accordance with some embodiments of the present invention. Reference is also made to FIG. 2, which is a flowchart of a method of setting up an interactive communication session between a querying client terminal and at least one responding client terminal identified based on a semantic match of a query to a structured dataset, in accordance with some embodiments of the present invention. Reference is also made to FIG. 3, which is a flowchart of an exemplary method for computing a structured dataset storing structured data created from unstructured data extracted from posted profiles of users of a social network, in accordance with some embodiments of the present invention. System 100 may implement the acts of the methods described with reference to FIG. 2, at least by processor(s) 102 of a computing device 104 executing code instructions (e.g., code 106A) stored in a memory 106 (also referred to as a program store).

Computing device 104 extracts unstructured data from postings to user profiles stored in a social network stored on a computing device(s) 152 to create unstructured dataset(s) 108A, as described herein.

Social network 152 may be central, residing, for example, on one or more servers that are connected to computing device 104 via a communication network 112. For example, computing device 104 may extract the unstructured dataset by issuing requests over a defined interface (e.g., application programming interface (API), software development kit (SDK) associated with social network 152. Alternatively or additionally, social network 152 may be hosted by computing device 104. Alternatively or additionally, social network 152 may be decentralized, such as posted user profiles stored by multiple connected computing devices. In such a case, computing device 104 may extract the unstructured data, for example, by crawling code that crawls the social network 152 by followings links and/or relationships between user profiles.

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 104 may be implemented. For example:

Computing device 104 acts as a centralized service provider that provides services to multiple client terminals 110A-B over network 112, for example, via a client code 150 executing on client terminals 110A-B that communicates with computing device 104. For example, an application programming interface (API), software development kit (SDK), functions and/or libraries and/or add-ons added to existing applications executing on client terminal(s), an application for download and execution on the client terminals that communicates with computing device 104, function and/or interface calls to computing device 104, a remote access section executing on a web site hosted by computing device 104 accessed via a web browser executing on the client terminal(s). For example, a querying client terminal 110A provides the query to computing device 104 via client code 150. Computing device 104 semantically matches the query to structured dataset(s) 108A stored thereon, and establishes the interactive communication session between querying client terminal 110A and responding client terminal(s) 110B, as described herein.

Computing device 104 is part of a decentralized network between querying client terminal(s) 110A and responding client terminal(s) 110B. Computing device 104 may issue instructions for direct establishment of the interactive communication session between querying client terminal 110A and responding client terminal(s) 110B.

Hardware processor(s) 102 of computing device 104 may be implemented, for example, as a central processing unit(s) (CPU), a graphics processing unit(s) (GPU), a field programmable gate array(s) (FPGA), a digital signal processor(s) (DSP), and an application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), a read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIG. 2 and/or FIG. 3 when executed by hardware processor(s) 102.

Computing device 104 may include data storage device(s) 108 for storing data, for example, structured dataset(s) 108A that stores structured data created from unstructured data extracted from user profiles posted to a social network. Data storage device(s) 108 may be implemented as, for example, a memory, a local hard-drive, virtual storage, a removable storage unit, an optical disk, a storage device, and/or as a remote server and/or computing cloud (e.g., accessed using a network connection).

Communication network 112 may be implemented as, for example, the internet, a local area network, a virtual network, a wireless network, a cellular network, a local bus, a point to point link (e.g., wired), and/or combinations of the aforementioned.

Computing device 104 may include a communication network interface 118 for connecting to communication network 112, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 and/or client terminal(s) 110A-B include and/or are in communication with one or more physical user interfaces 114 that include a mechanism for user interaction, for example, to enter the search query, and/or execute the interactive session including entering data into the session and viewing responses of others. Exemplary physical user interfaces 114 include, for example, one or more of, a touchscreen, a display, gesture activation devices, a keyboard, a mouse, and voice activated software using speakers and microphone.

Client code 150 may be locally stored on a data storage device (e.g., memory) of client terminals 110A-B. Client code 150 may be obtained from computing device 104 and/or other servers, optionally over network 112. Client code 150 may include a GUI for entering the query and/or code for executing the interactive communication session. Client code 150 may include code for communicating with computing device 104 over network 112.

Client terminal(s) 110A-B may be implemented as, for example, a desktop computer, a server, a virtual server, a network server, a web server, a virtual machine, a thin client, and a mobile device.

Referring now back to FIG. 2, at 202, a structured dataset is provided and/or created. The structured dataset stores structured data created from unstructured user generated content, and/or unstructured user reactions, extracted from posted profiles of user credentials of a social network. Examples of social networks include: Facebook, LinkedIn, Twitter, and Instagram.

The unstructured user generated content may include a network document, for example, a posted personal page of the user credentials, a posted business page, a posted official page (e.g., of an artist), a page of a fan group and/or other groups. An example of a network document is a Facebook™ fanpage. The network document may be a document (e.g., page) created by another entity (other than the user associated with the user credentials) and/or stored on a profile of the other entity, for example, the user (of the user credentials) is following the network document and/or posted a user reaction to the network document (e.g., "like"). Alternatively or additionally, the network document is a document (e.g., page) created by the user (of the user credentials) and/or posted on the personal profile (e.g., personal page) of the user. The network document may store multiple user generated content objects of various formats, for example, text, audio data, videos, images, and files. The network document may be linked to one or more users, other than the user that created the personal page (e.g., being followed, for example, a Facebook Fanpage). The unstructured user generated content may include user generated content objects, for example, user posts. The user posts may include one or more objects of various format and/or types, for example, text, videos, images, audio data, and files. The user generated content objects, generated by a certain user, may be posted on the certain user's own network document (e.g., posted by the user on their own personal profile page), and/or posted on another user's network document.

Exemplary unstructured user reaction(s) include: reaction of a certain user to a network document associated with reactions by multiple other users, a reaction of the certain user to a content object generated by another user, and a reaction of another user to a network document of the certain user and/or a content object generated by the certain user. Network document and/or user generated content object may be associated with user reactions provided by users other than the user that created and/or posted the network document and/or content object. The user reactions may be positive, negative, represented by an emotion, and/or indicative of an amount of satisfaction. Exemplary user reactions include: a Facebook Like, a thumbs up, a thumbs down, a smiling emoticon, an angry face emoticon, and a star rating on a scale of 1-5 or 1-10.

The structured dataset stores an indication of each user credential that generated each unstructured user generated content. For example, the unstructured user generated content is indexed according to an index created for each user credential, and/or the unstructured user generated content is mapped to each user credential, for example, via a graph data structure, by pointers, and/or storage in a database in association with the user credential.

Optionally, the structured dataset stores user relations defining relationships between user credentials. The user relations may be extracted from unstructured links of the personal profiles that map between users, for example, friends, contacts, and users that posted content on a network document of another user. User relations may be directed, or bidirectional. The user relations may be stored, for example, as a graph, and/or a set of user credentials linked to each user credential.

An exemplary process for creating the structured dataset is described with reference to FIG. 3.

At 204, a query is received from the querying client terminal.

The query may include text. The text may be manually entered by the user. Alternatively, the query may be automatically provided by a process executed by the querying client terminal. The query may include automatically selected data objects, optionally including text, for example, an article, an ad, and a sponsored question. In such a case, the systems, methods, apparatus, and/or code instructions described herein automatically match the automatically selected data object to one or more users representing users most interested in and/or most expert in the topic associated with the automatically selected data object.

The query may be entered into a GUI. The query may be entered, for example, into an application locally executing on the client terminal that communicates with a server (i.e., computing device), and/or into a web site hosted by the server via a web browser executing on the client terminal, and/or into a third party site optionally assessed via the social network hosted by a third party server that communicates with the server (e.g., via API, SDK, and/or other interfaces).

Figure 4:
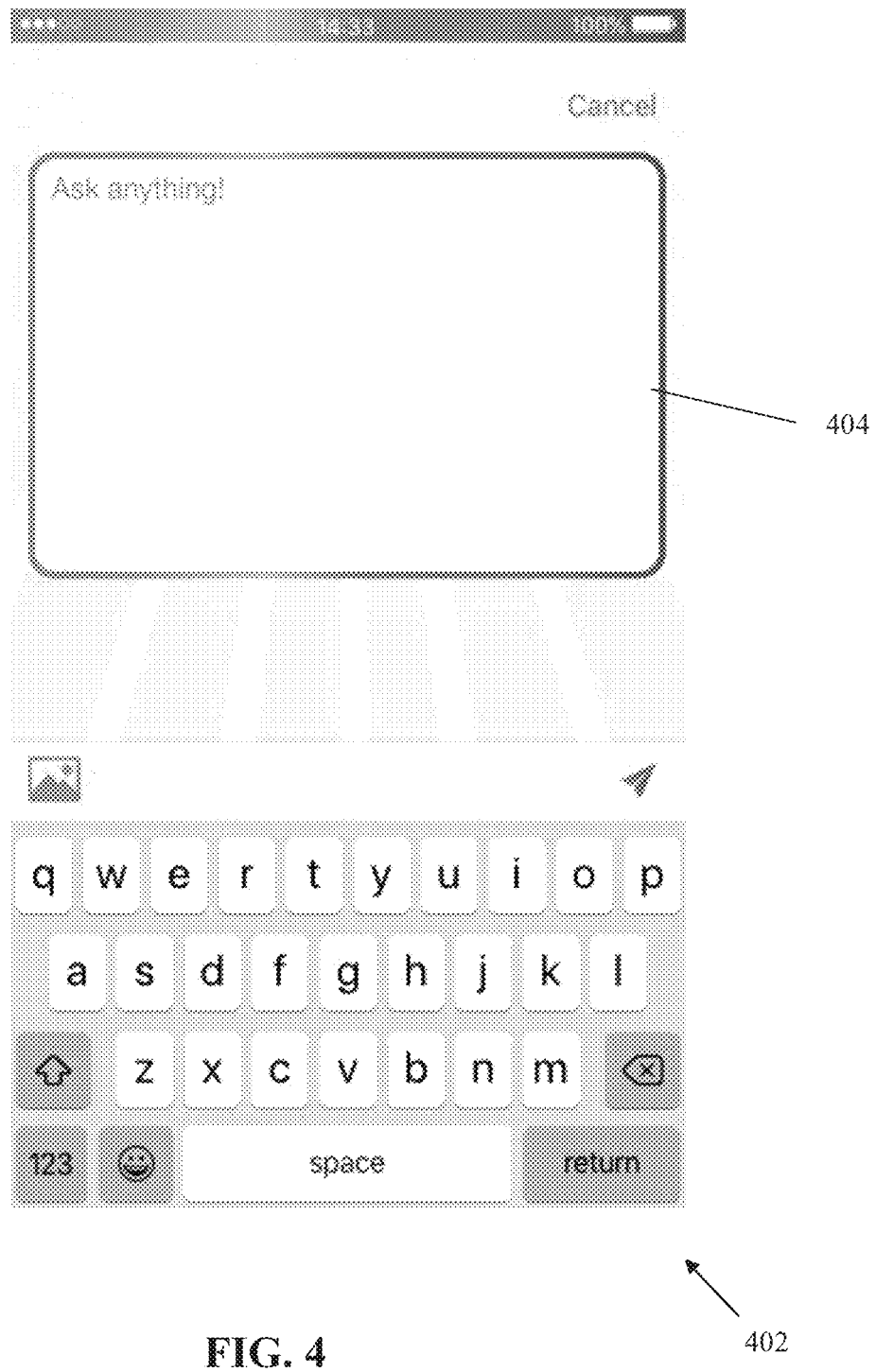
FIG. 4 is a schematic of an exemplary GUI including a field designed for a user to enter a query, in accordance with some embodiments of the present invention.

Reference is now made to FIG. 4, which is a schematic of an exemplary GUI 402 including a field 404 designed for a user to enter a query, in accordance with some embodiments of the present invention. Field 404 may be designed to receive text input, for example, for the user to manually type word(s) of the query into field 404. GUI 402 may be designed for display on small screens, for example, displays of mobile devices such as smartphones, watch computers, wearable computers, and tablets.

Referring now back to FIG. 2, at 206, the query is semantically matched to the structured dataset.

Optionally, the query is analyzed for selecting one or more keywords based on an analysis of computed word scores assigned to each of the words of the query. The scores may be indicative of relative importance within the query. For example, the score may be indicative of whether the respective term is a common term of relatively little significance to the query (e.g., "the", "who", "a", "is"), or whether the respective term indicates a key concept and/or feature of the query (e.g., a specific name of a person, a specific geographical location). For example, the highest ranking words are selected (and optionally the other words are ignored), and/or words having a score above a threshold are selected. The word scores may be assigned to each of the words of the query according to an analysis of a structured word index created from the unstructured user generated content, for example, as described with reference to act 304 of FIG. 3. The selected keywords are semantically matched to the structured dataset.

Optionally, the query is analyzed to identify a user category and/or user interest. For example, a trained statistical classifier may output one or more user categories and/or one or more user interests in response to an input of the query. In another example, one or more keywords may be associated with an indication of user category and/or user interest (e.g., tagged, mapped by a mapping dataset, associated with pointer(s)). The user category and/or user interest are identified based on the identified keywords. The query user category and/or user interest may be used to select a subset of the matched user credentials, as described with reference to act 208.

Optionally, the query is semantically matched to the structured dataset by searching indexed user generated content of the structured dataset with the keyword(s) to identify matching structured indexed user generated content objects, for example, by a search engine that searches indexed data in response to keyword(s). The structured indexed user generated content is created by indexing of the unstructured user generated content, for example, as described with reference to act 304 of FIG. 3.

Optionally, words of the query are semantically matched to the structured dataset according to the standardized terms of the unstructured user generated content. When terms of the content are standardized (e.g., as described herein with reference to act 310 of FIG. 3), the keywords of the query may correspond to the standardized terms. For example, the identified keywords of the query are converted into corresponding standardized terms.

Optionally, the query is further semantically matched to the structured dataset, by matching the user category and/or user interest computed for the query with indexed user category and/or user interest stored in the structured dataset.

At 208, one or more (optionally multiple) matched user credentials of users of the social network are selected according to an analysis of the matched structured data.

Optionally, the matched user credentials are selected according to the matching structured indexed user generated content objects. Optionally, the matched user credentials are selected by mapping the matching structured indexed user generated content objects to the matched user credentials according to a mapping dataset of the structured dataset. The mapping dataset is created according to an analysis of the unstructured user generated content, and the unstructured user reactions.

The mapping dataset may be implemented as, for example, a graph including nodes, and edges connecting the nodes. The nodes may be indicative of one or more of: an indexed network document of user generated content objects, indexed user generated content objects, user credentials, and a computed user category. Edges connecting the nodes may include one or more of: a link between user credentials and an indexed network document of user generated content objects, a link between user credentials and indexed user generated content objects, a link between an indexed network document of user generated content objects and a category, and user credentials and a category. Each indexed network document is linked to multiple user credentials. Each indexed user generated content object is linked to a single user credential. Unstructured user reactions may be stored as weights of the edges. An exemplary process for constructing the graph is described with reference to act 304 of FIG. 3.

The matched user credentials may be selected according to a score computed for each of multiple candidate user credentials. The candidate user credentials are identified based on being mapped to the matching structured indexed user generated content objects. Each score is indicative of correlation between the respective candidate user credentials and the keyword(s). The score may be computed according to an analysis of the mapping dataset, for example, based on the number of links in the mapping dataset mapping network documents and/or data objects to the user credentials, based on the number of keywords appearing in network documents and/or data objects, and/or weight of links (e.g., computed according to user reactions, such as an average of ranking, and/or number of positive feedback indications). The matched user credentials may be selected according to the highest scores of the candidate user credentials, for example, the top predefined number of candidate user credentials having the highest scores, and/or all candidate user credentials above a score threshold.

Optionally, the analysis of the matched structured data for selecting the matched user credentials is according to a uniqueness score computed according to one or more categories assigned to the matched structured data and/or according to a match with a category computed for the query. The category may be computed for the query, for example, by a statistical classifier that outputs the category when provided with the query as input. In another example, the category is determined based on keywords of the query identified as categories. The structured dataset includes a categorization of the unstructured user generated content into multiple categories. Each unstructured user generated content may include a network document linked to user credentials, optionally via unstructured user reactions. Each category of the multiple categories is associated with a computed category uniqueness score. The category uniqueness score is indicative of uniqueness of the user credentials to the respective category and/or the uniqueness of the respective category relative to the multiple categories. For example, a small number of user credentials mapped to a certain category receive a relatively high uniqueness score. A certain category with a large number of associated user credentials receives a relatively low uniqueness score. A certain category with a small number of associated web documents and/or data objects receives a relatively high uniqueness score. Optionally, the user credentials associated with highest uniqueness scores are selected, for example, from the top number of predefined user credentials and/or user credentials above a uniqueness score threshold.

Optionally, the matched user credentials are further selected (e.g., filtered, and/or selection of a subset of the matched user credentials) according to a correlation score computed based on a correlation between a user profile of the querying credentials of the querying user that provided the query and a user profile of each of the matched user credentials. The correlation score is indicative of a match between parameters associated with the querying user credentials and the matched user credentials that may be independent of (e.g., not stored in) the data stored in the structured dataset. The correlation score may increase the likelihood of the user associated with the matched user credentials participating in the communication session, and/or increase the likelihood of the user associated with the matched user credentials being able to accurately discuss the query. The user profiles may be provided and/or created, for example, based on data extracted from the social network (e.g., geographical location, birthday), and/or based on user entered data (e.g., income) such as provided during setup of a user account. Exemplary parameters stored in the user profile include: demographic data, age, income, education level, geographical location, preferred time of day, and indication of relationships between a respective user and other users (e.g., linked contacts, friends, followers, and other users the user is following). For example, matched users in the same time zone as the querying user may be more likely to participate in the session. In another example, matched users that are of a similar income and/or education level to the querying user may provide responses to the query that are more relevant to the querying user. In another example, matched users that have friends and/or contacts in common with the querying user are assigned a higher weight over matched users that do not have any friends and/or contacts in common with the querying user.

Optionally, the matched user credentials are selected and/or further selected (e.g., filtered, and/or selection of a subset of the matched user credentials) according to a matching between the user category and/or user interest computed for the query, and the user category and/or user interest associated with the user credentials. The user credentials may be indexed according to computed user category and/or user interest, as described herein.

Figure 5:
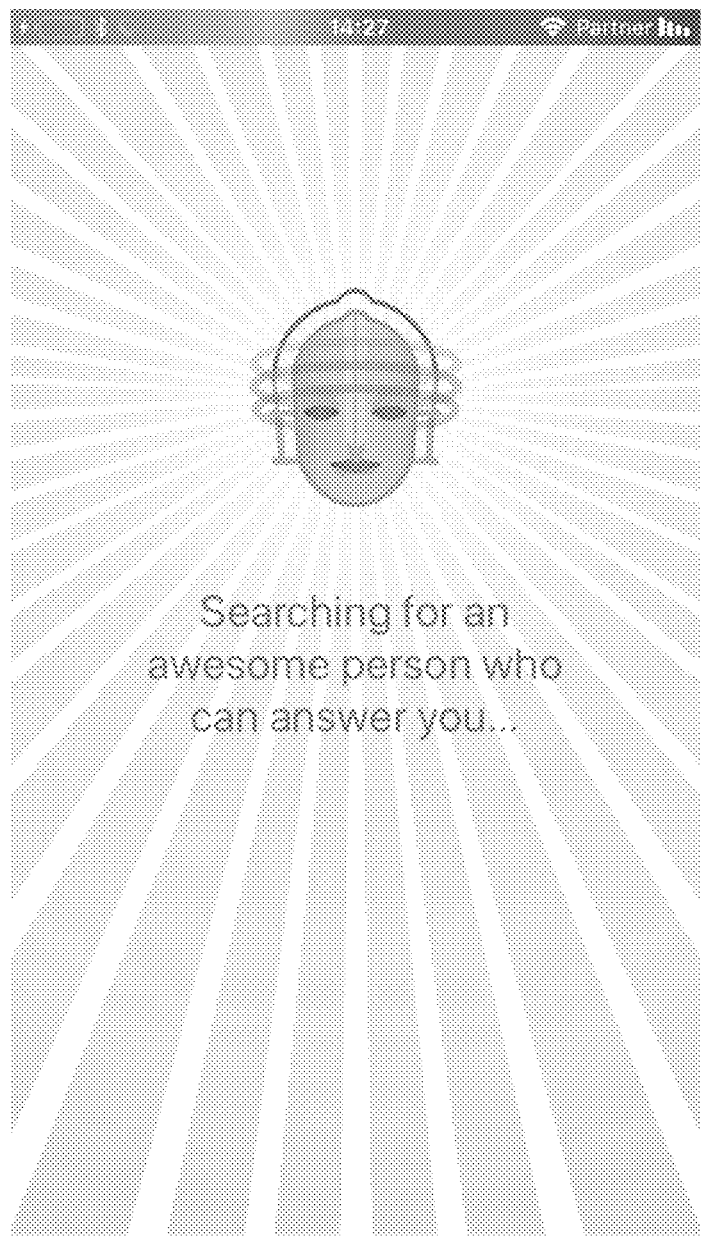
FIG. 5 is a schematic of GUI presenting a message during the process of semantically matching the query to the structured dataset and selection of matched user credentials of users of the social network according to the analysis of the matched data, in accordance with some embodiments of the present invention.

Reference is now made to FIG. 5, which is a schematic of GUI 502 presenting a message during the process of semantically matching the query to the structured dataset and selection of matched user credentials of users of the social network according to the analysis of the matched data, in accordance with some embodiments of the present invention. An example of a presented message is "Searching for an awesome person who can answer you . . . .".

At 210, a request for joining an interactive communication is distributed to the matched client terminal(s) of the matched user credential(s). The request may be, for example, sent as a link that when clicked adds the matched user credentials to the interactive communication session, a flashing message indicating to the matched user to log into an application to check the request, as an email (which may contain the link for joining the application), and/or a pop-up with the request.

The request may include an option for the user to select to reply to the request (i.e., indicating agreement to join the interactive communication session), ignore the request, and/or deny the request, for example, as icons. The request may include the link that when clicked adds the responding user to the interactive communication session.

Optionally, the request is distributed according to a set of rules and/or an analysis of parameters of the target matched user credentials. For example, the set of rules may define distributing the request during an allowable range (e.g., waking hours and/or business hours, e.g., 8 AM to 8 PM) of the time zone in which each respective matched user credentials is located. Requests may be delayed until the time at the time zone of each matched user credential is within the allowable range. In another example, the request may be prevented from being distributed, or delayed in being distributed, to matched user credentials that already have one or more pending unanswered request. In another example, the response pattern of the matched user credentials to previous request may be analyzed to determine when the matched user credentials is most likely to respond, and the request is sent accordingly, for example, during a weekend.

At 212, one or more responses to the request are received from a responding client terminal(s) of a responding user credential(s) of a responding user(s). The responses may be explicit, for example, the user clicking on an icon indicating that the user wishes to respond. The response may be implicit, for example, the user clicking on the icon for being added to the interactive communication session.

Optionally, multiple responses received, each response received from another responding client terminal to a certain responding user credential of a certain responding user.

Optionally, no direct social relationships exist in the social network between the querying user credential and the responding user credentials. In other words, the querying user and the responding users do not necessarily know one another, have not previously communicated between each other, and/or may not be aware of each other's existence. At least some of the systems, methods, apparatus, and/or code instructions described herein may establish communication (via the interactive communication session) between users that would otherwise not necessarily communicate.

Reference is now made to FIG. 6, which is a schematic 602 depicting an example of response(s) received from matched user credentials to which a request for joining the interactive communication session has been distributed, in accordance with some embodiments of the present invention. Schematic 602 may be presented within a GUI displayed on a display of the querying client terminal of the querying user. Alternatively, schematic 602 is not explicitly displayed. In the presented example, one user 604, responded to the query. The time when the request was sent may be presented. The time when the response was received from each matched user credential may be presented.

At 214, the interactive communication session is established between the querying client terminal of the query user credentials (i.e., the user that provided the query as described with reference to act 204), and the responding client terminal(s) of the responding user credential(s) of the responding users.

The interactive communication session may be established after a requirement is met, for example, after a predefined time interval has elapsed from distribution of the requests, and/or after a minimum number of predefined users have responded. Alternatively or additionally, the establishment of the interactive communication session is triggered by the first response. Subsequent additional responding users may be dynamically added to the established interactive communication session.

Optionally, the communication session is established within a GUI. The GUI may be the same GUI used by the user to enter the query (e.g., as described with reference to act 204).

As used herein, the terms responding client terminal and responding user credentials may sometimes be interchanged. The terms querying client terminal and querying user credentials may sometimes be interchanged. For example, the interactive communication session may be established between the responding client terminals and the querying client terminals, and/or may be established between the responding user credentials and the querying user credentials (i.e., using displays of the respective client terminals being used by the respective users).

The interactive communication session may be, for example, a chat messaging session including a text based chat session (optionally including the ability to transmit multimedia data objects such as documents, images, videos, and/or audio files), and/or a video based chat session.

The interactive communication session may be automatically established by adding the responding user credentials and the user credentials of the querying user as participants of the interactive communication session.

Optionally, a new group is created based on an interactive communication session platform designed to accommodate multiple different created groups. The new group may be automatically created. The responding client terminals (e.g., the responding user credentials) and the querying client terminal are added as participants of the new group. The newly created group may be dedicated to a discussion of the query. The newly created group may be deleted after the discussion of the query has terminated. Alternatively, an existing interactive session is identified where the responding client terminals are participants of the existing interactive session. The identified existing interactive session may include only the responding client terminals, or may include additional client terminals (and/or additional user credentials) that have not been matched to the query. The querying client terminal is added to the identified existing interactive session. Adding the querying client terminal may be performed while retaining data objects (e.g., text, multimedia objects, files) previously posted by the other participants. When the discussion of the query has completed, the querying client terminal may be removed from the existing group, while the other previous participants are maintained as members of the existing group.

Optionally, when multiple responses are received from multiple responding client terminals, a single interactive communication session is created between the multiple responding client terminals and the querying client terminal. The multiple responding user credentials of the multiple responding client terminals may be added as participants to the single interactive communication session. The single interactive communication session may be, for example, a group chat, where all participants of the single interactive communication session are able to post text and/or multimedia objects to the interactive session and/or view all posted text and/or posted multimedia objects posted to the session. Alternatively, when multiple responses are received from multiple responding client terminals, multiple one-on-one interactive communication sessions are established. Each session is established between the querying client terminal and one of the responding client terminals. The GUI may present an indication of the multiple sessions and a mechanism for switching between the sessions, enabling the querying user to simultaneously participate in multiple sessions.

Optionally, when the query includes an automatically selected data object (e.g., an article, an ad, and a sponsored question), the interactive communication session may be established between the responding client terminal(s) and a client terminal of a user able to discuss the automatically selected data object. For example, when the automatically selected data object is an ad, the responding users may be added to an interactive communication session with a salesperson of the company that sponsored the ad.

Figure 7:
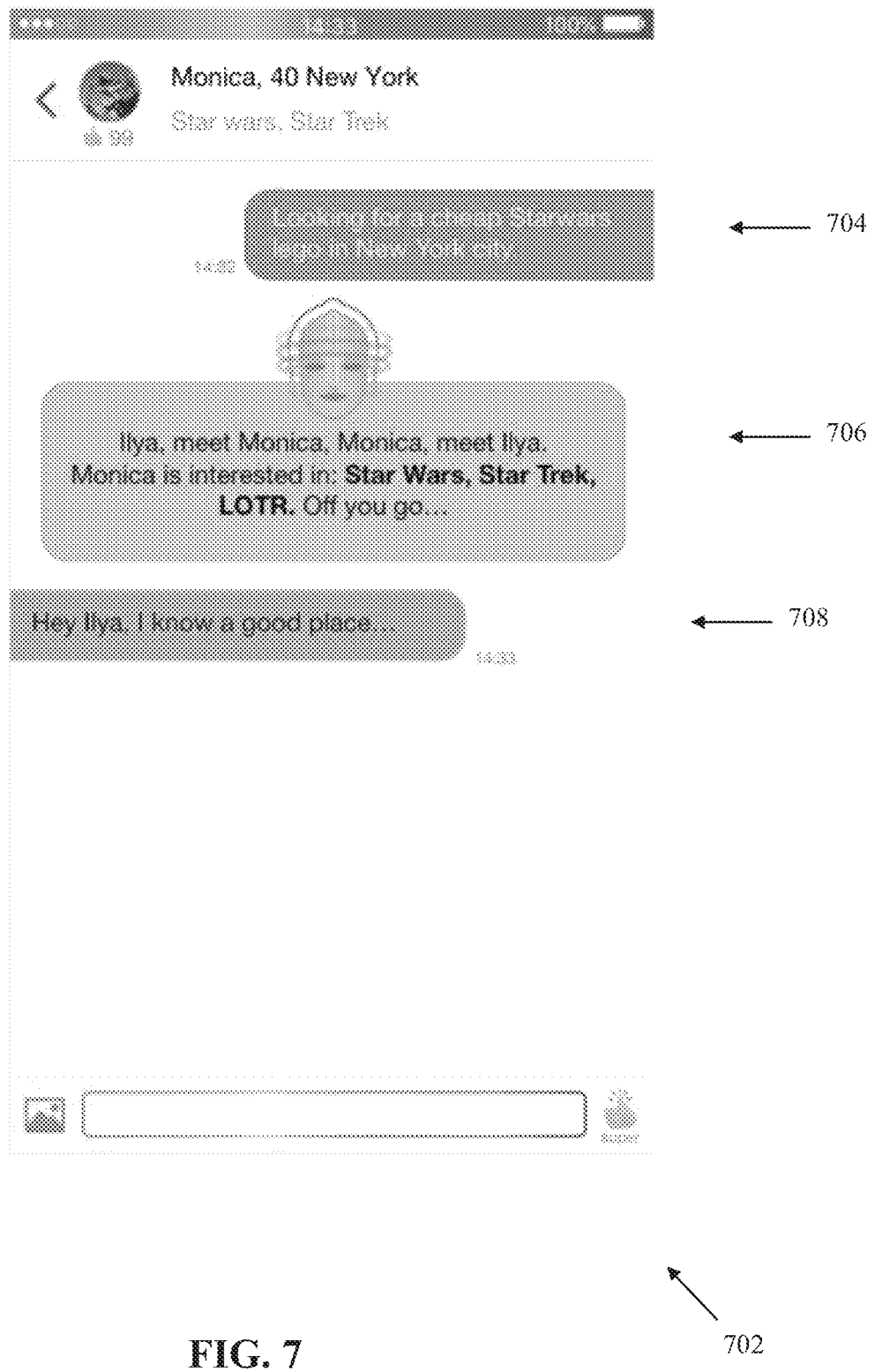
FIG. 7 is a schematic of a GUI of a chat based interaction session, as seen from the GUI of the responding user, in accordance with some embodiments of the present invention.

Reference is now made to FIG. 7, which is a schematic of a GUI 702 of a chat based interaction session, as seen from the GUI of the responding user, in accordance with some embodiments of the present invention. The query 704 may be presented within the GUI, for example, as part of the process for distribution of the request described herein. The responding user may be provided with an option to provide a response to the request, for example, by clicking on a selection icon associated with the request. A message window 706 may be presented as an introduction to the established communication session, for example, indicating the user credentials (e.g., name) of the querying user, and the responding user(s), and/or the matched keywords identified based on the query. Message windows 708 are created as the participants (i.e., querying user and responding user(s)) interact within the established communication session, for example, posting text messages.

Figure 8:
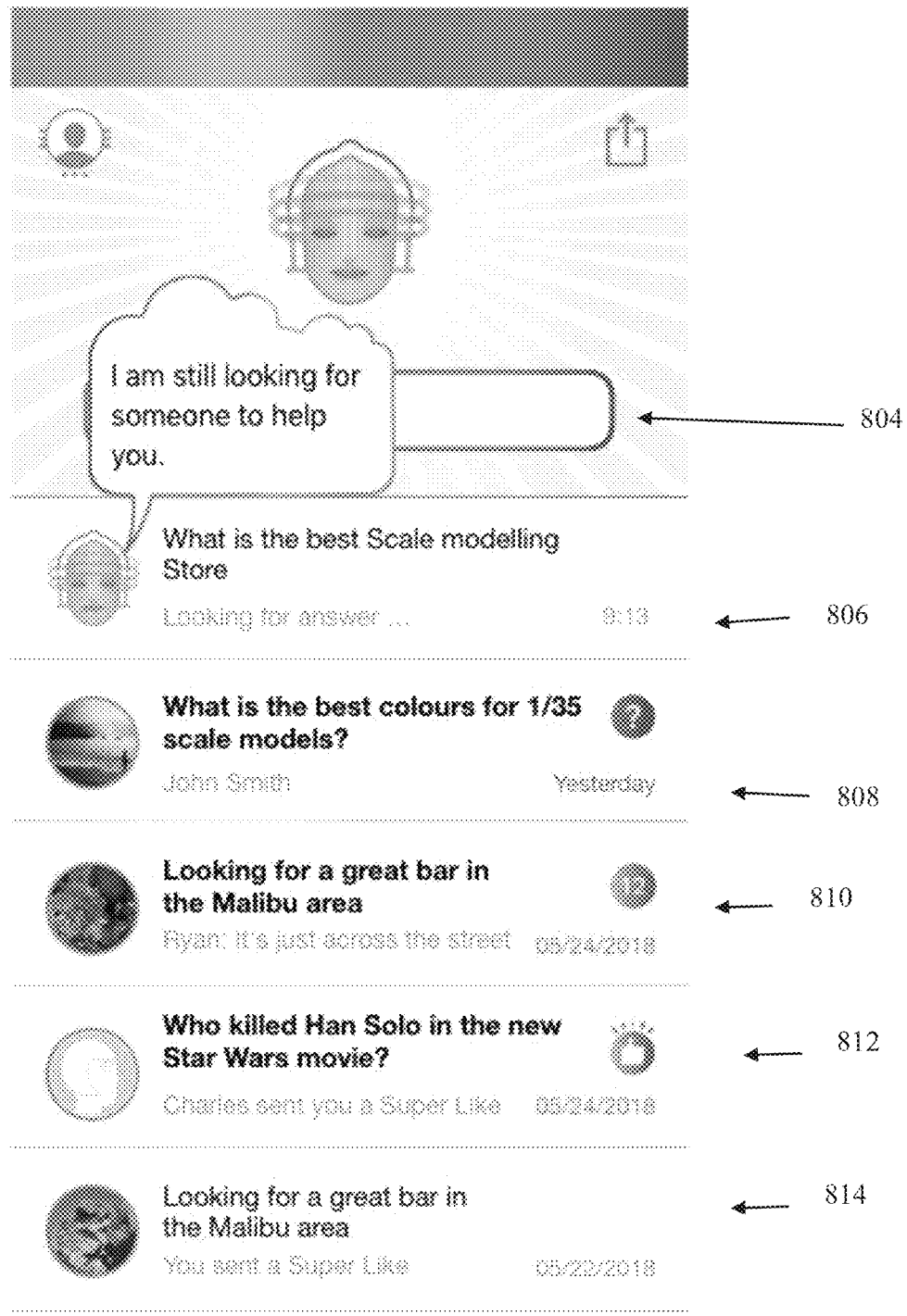
FIG. 8 is a schematic of a GUI of a user, in accordance with some embodiments of the present invention.

Reference is now made to FIG. 8, which is a schematic of a GUI 802 of a user, in accordance with some embodiments of the present invention. The GUI includes multiple regions reflecting multiple possible actions of the user including:

A region 804 to submit a new query as described herein

An indication of a query entered by the current user (i.e., querying user), which is waiting for responses 806. The user entered the query "What is the best Scale modeling Store"

Existing interactive sessions 808 812 of which the user is a current participant as a responding user, discussing the topics of "What is the best colours for 1/35 scale models?" (808), and "Who killed Han Solo in the new Star Wars movie?" (812). It is noted that for 812, the querying user sent the responding user a Super Like rating, which is indicative that the responding user provided the response to the query that the querying user was looking for (e.g., satisfactory answer, great answer).

Existing interactive session 810 of which the user is participating as the querying user that provided the query, along with other responding users. The topic being discussed is the query provided by the current user, "Looking for a great bar in the Malibu area" (810).

814 is another independently interactive session with another responding user to the same question as in 810. 810 and 814 are independent one on one interactive sessions, where the same current querying user is interacting with two different responding users. The current user sent a Super Like rating to the responding user in 814.

Optionally, at 216, the structured dataset is updated based on the interactive communication session.

Optionally, the structured dataset is updated with structured data created from the user generated content posted to the interactive communication session by the querying user and/or responding user(s). The posted content may be processed as described herein with reference to the unstructured user content objects, where messages and/or data objects posted by each user are associated with the posting user credentials of the user. The update of the structured dataset to include the content of the interactive communication session may increase the accuracy of identifying matching user credentials in response to a query.

Alternatively or additionally, the structured dataset is updated with structured data created from an analysis of interactions of the querying client terminal and the responding user credentials with the interactive communication session. The analysis of the interactions may be performed, for example, by the GUI and/or app executing on a client terminal, and/or by the computing device monitoring the session. The additional data includes, for example, an indication of measured activity of each user during interactive communication session(s), indicators of engagement such as number of messages posted during each interactive communication session, number of posts during the interactive communication session, number of words posted during the interactive communication session, number of interactive communication sessions in which the respective user credentials participated in, total time spent participating in the interactive communication session, and a reaction by the querying client terminal to the at least one responding user credentials indicative of response to the query.

The structured data created from an analysis of interactions may be used for further selecting a subset of the matching user credentials, as described with reference to act 208 of FIG. 2. For example, the user credentials associated with relatively highest scores computed according to the analysis of the interactions are selected over user credentials with relatively lower scores. The selected user credentials are indicative of users more likely to provide satisfactory answers to the query and/or more likely to respond to the request to participate in the interactive communication session, based on their past interaction history.

The unstructured data obtained from the interactive communication session may be structured for updating the structured dataset, for example, by association with the identified user interest and/or identified user category and/or associated keywords.

Optionally, when the matching of the query to the structured dataset is performed by a statistical classifier. For example, the additional data extracted according to an analysis of the interactive communication session (e.g., indication of activity and/or indication of engagement) are used as target rewards during training of the statistical classifier.

Referring now back to FIG. 3, at 302, the structured dataset is updated based on the querying user credentials. The structured dataset is updated with structured data created from unstructured content generated by the querying user credentials that provided the query, and unstructured reactions of the querying user credentials, extracted from posted profile(s) of the querying user credential of the social network. For example, structured data is created for each querying user credentials, optionally for each new querying user credentials.

Optionally, the querying user (and/or users agreeing to act as responding users) provides permission for extraction of the data of the querying user from a social network. When the querying user (and/or responding user(s)) does not have a user account on the social network, the querying user (and/or responding user(s)) may be directed to open an account on the social network, for example, via a link and/or a re-directions instruction. The querying user (and/or responding user(s)) may provide personal data, which may be extracted, processed, and/or analyzed, to create the structured dataset and/or or matching responding users, as described herein. Exemplary data provided by the user and/or extractable from the social network include one or more of: user ID number, a real name of the user including first name and last name, a link to the personal profile page of the user hosted by the social network, a username (e.g., which may be used as the user credentials described herein), gender, time zone, geographic location, an indication of verification of the user provided data, and a timestamp indicating when the user data was provided (which may be updated when the user data is updated).

It is noted that the data provided by the querying user (and/or responding user(s)) may be provided initially during setup of the social network account, and/or extracted from a preexisting user account, optionally when permission to access the personal data is provided by the querying user (and/or responding user(s)).

The data of the user may be extracted by the computing device from server(s) hosting the social network, for example, using a software interface (e.g., API, SDK).

The user, using the user profile, may post content to the social network (e.g., feedback, articles, documents), may link to other users, may create network documents (e.g., which may receive posts from other users and/or may receive user reactions from other users), and/or may provide user reactions to content posted by other users, as described herein.

Figure 9:
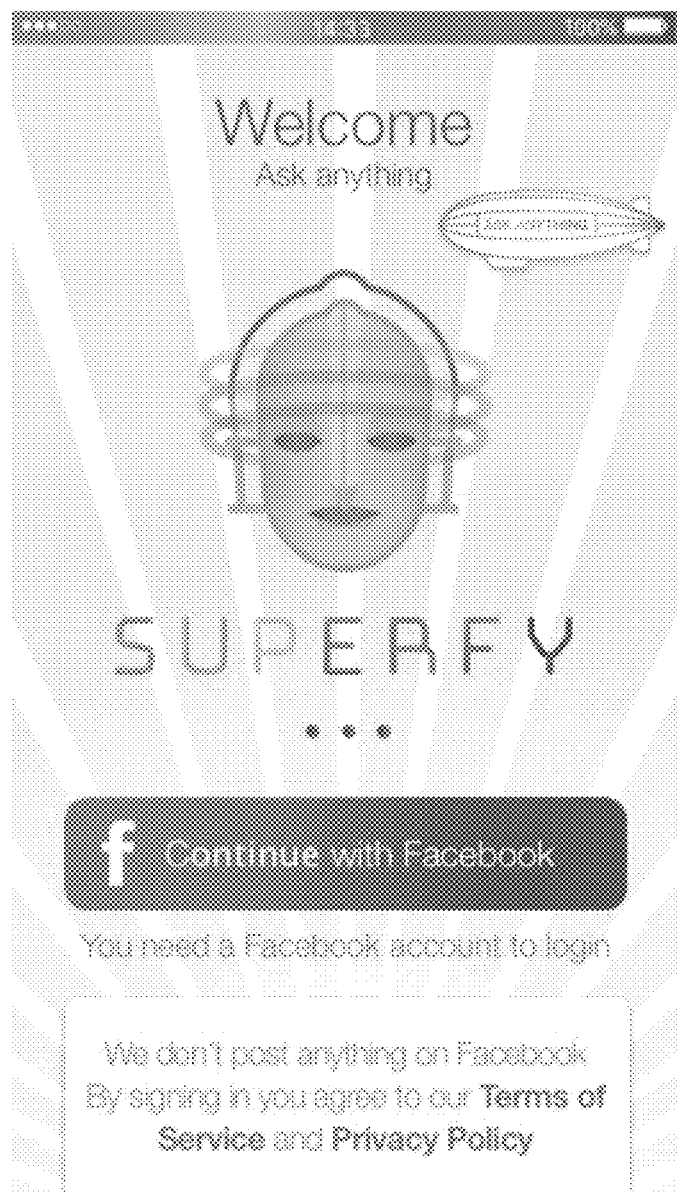
FIG. 9 is a schematic of an exemplary GUI for extracting unstructured data of posted user content from a social network, in accordance with some embodiments of the present invention.

Reference is now made to FIG. 9, which is a schematic of an exemplary GUI 902 for extracting unstructured data of posted user content from a social network, in accordance with some embodiments of the present invention. Users wishing to use the GUI described herein may require accounts of the social network.

Figure 10:
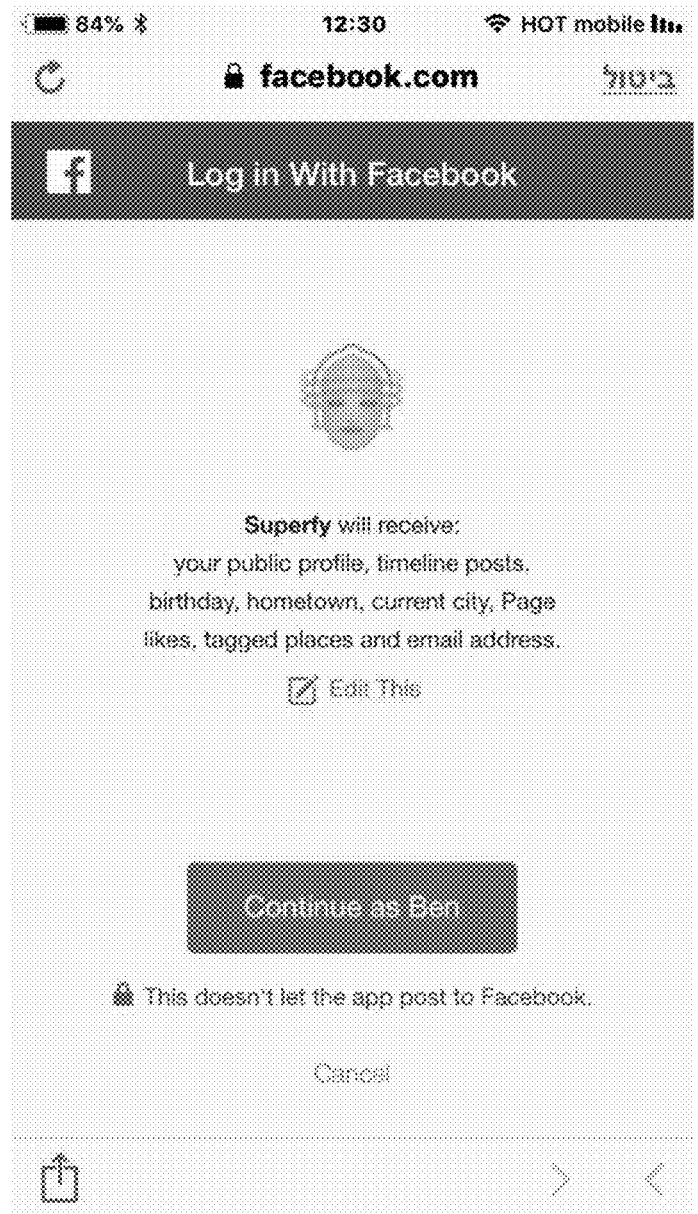
FIG. 10 is a schematic of an exemplary GUI for providing permission for extracting unstructured data of the user from the social network, in accordance with some embodiments of the present invention.

Reference is now made to FIG. 10, which is a schematic of an exemplary GUI 1002 for providing permission for extracting unstructured data of the user from the social network, in accordance with some embodiments of the present invention. The unstructured data is analyzed and/or processed for storage in the structured dataset, as described herein. Exemplary unstructured data of the user obtained from the social network includes one or more of: public profile, timeline posts, birthday, hometown, current city, Page likes (e.g., user reactions), tagged places, and/or email address. Upon accessing the GUI and/or logging into the GUI and/or logging into the social network, unstructured data of the social network, optionally associated with the user, may be collected, for example, via issuing commands to a user interface of the social network (e.g., API, SDK), and/or crawling code that crawls the social network using links between user postings and/or links between network pages of users and extracts unstructured data.

Figure 11:
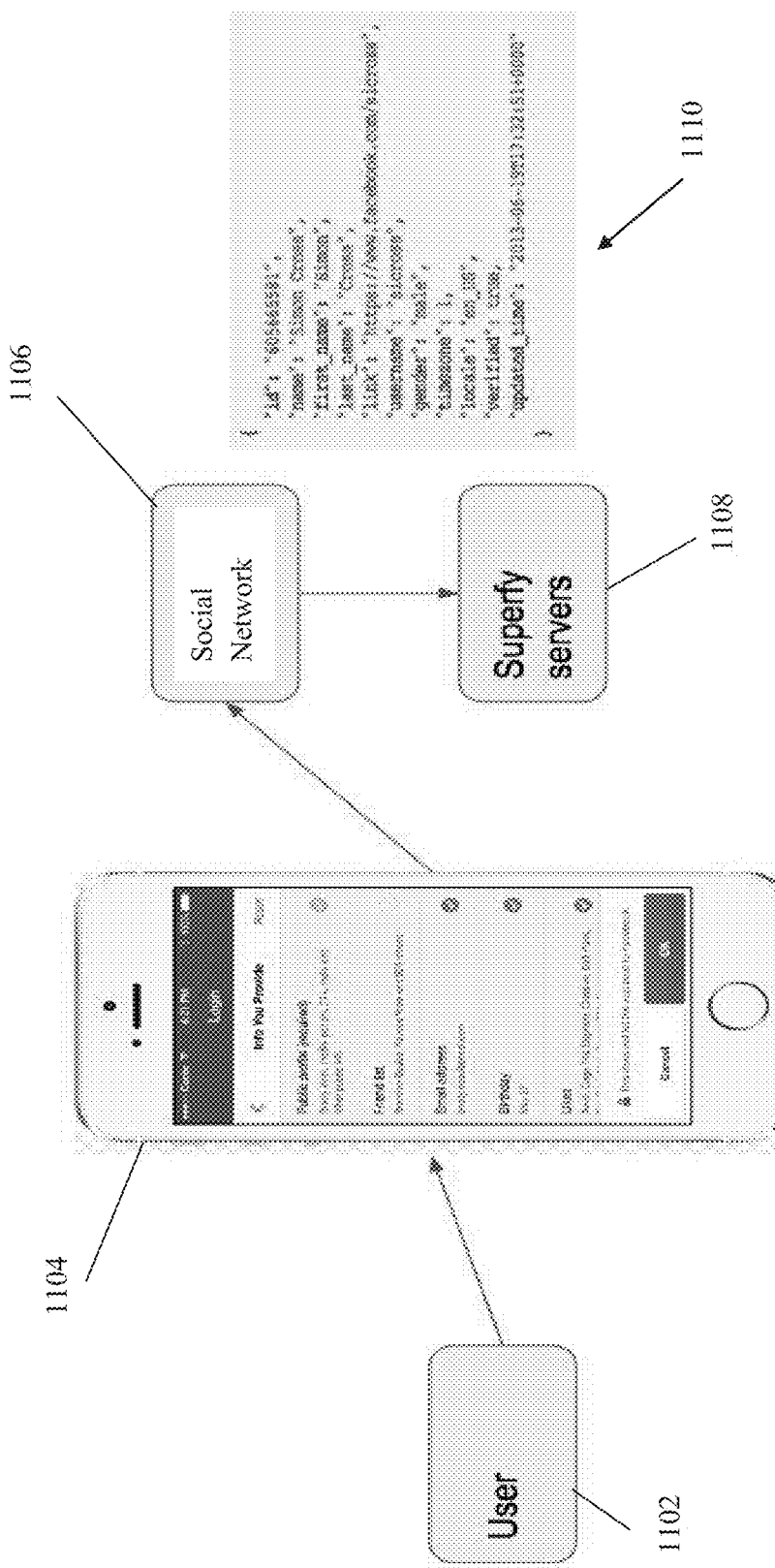
FIG. 11 is a schematic depicting dataflow for obtaining user data of a new user, in accordance with some embodiments of the present invention.

Reference is now made to FIG. 11, which is a schematic depicting dataflow for obtaining user data of a new user, in accordance with some embodiments of the present invention. A user 1102 enters personal data into a GUI 1104 executing on a client terminal, for example, on a mobile device such as a smartphone. GUI 1104 may be for a social network 1106, where the personal data entered by the user is used to create a user profile of the user. The personal data may be extracted by server(s) 1108. The extracted personal data may be stored in the structured dataset as described herein, for example, according to a defined format as shown in 1110.

Referring now back to FIG. 3, at 304, the structured dataset (e.g., one or more sub-dataset components of the structured dataset) is computed from unstructured data extracted from posted profiles of user credentials of the social network.

Optionally, personal data of user credentials extracted from the social network may be indexed and/or stored in one or more structured sub-datasets. The structured dataset described herein may be implemented as an aggregation of the sub-datasets.

Figure 12:
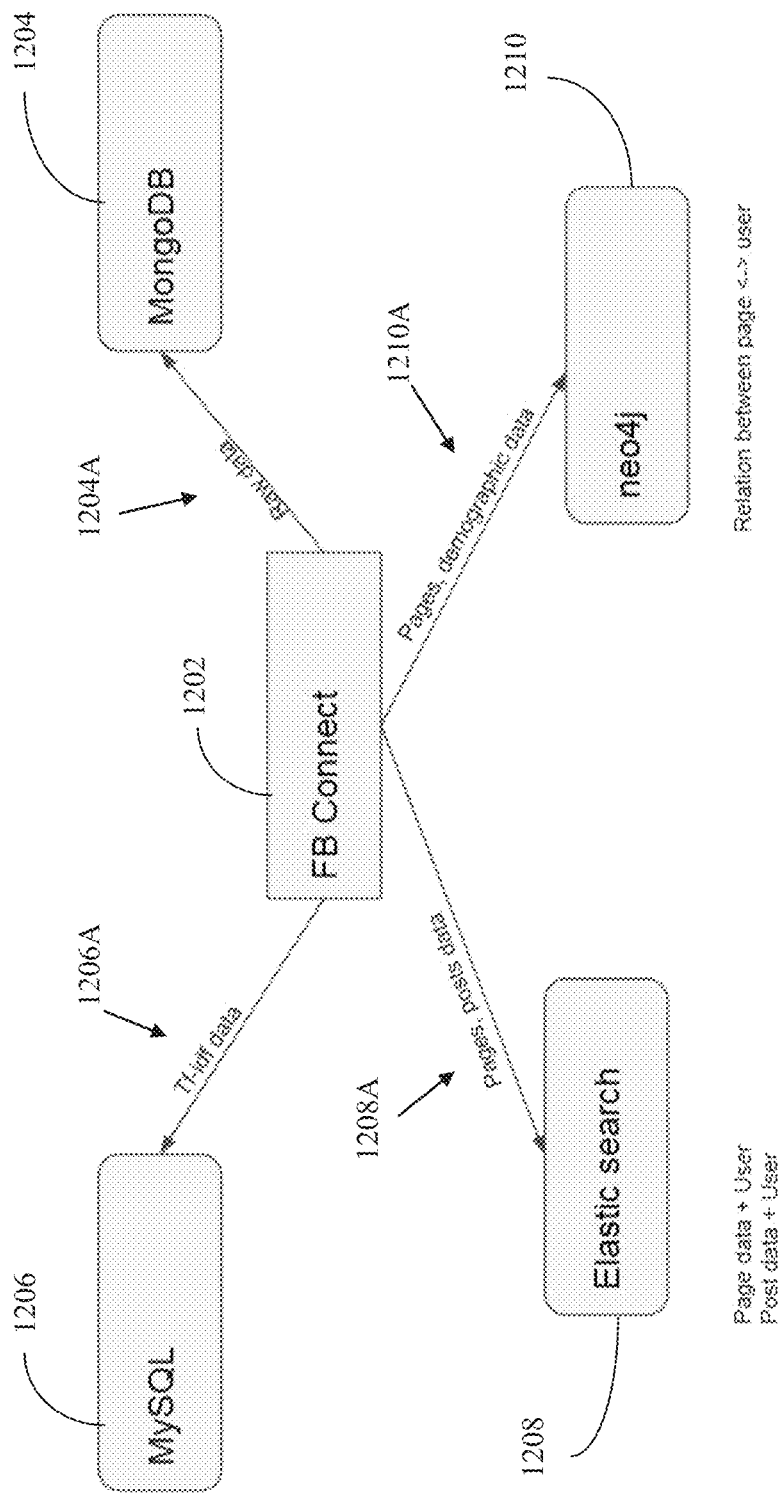
FIG. 12 is a schematic depicting indexing and/or storage of the personal data of the users extracted from the social network in one or more structured sub-datasets of the structured dataset, in accordance with some embodiments of the present invention.

Reference is now made to FIG. 12, which is a schematic depicting indexing and/or storage of the personal data of the users extracted from the social network in one or more structured sub-datasets of the structured dataset, in accordance with some embodiments of the present invention. The personal data of the users is extracted from the social network 1202, and stored in the following exemplary datasets:

A dataset 1204 for storing raw data 1204A extracted from social network 1202. Relational dataset 1204 may be implemented as, for example, MongoDB (NOSQL). The raw data 1204A may be stored as structured data using a defined format, for example, based on JSON. The structured data stored in dataset 1204 may be provided as input into datasets 1206, 1208, and/or 1210.

A relational dataset 1206 for storing word frequency data 1206A computed according to an analysis of the extracted personal data, as described herein. Relational database 1206 may be implemented as, for example, SQL, MySQL.

The word frequency data 1206A may be computed as term frequency-inverse document frequency (tf-idf) data. Term and document data may be stored for each content object and/or network document. The tf-idf data may be computed according to the following relationships:

$$tf(t, d) = 0.5 + 0.5 \cdot \frac{f_{t,d}}{\max\{f_{t',d}: t' \in d\}}$$

$$idf(t, D) = \log \frac{N}{|\{d \in D: t \in d\}|}$$

$$tfidf(t, d, D) = tf(t, d) \cdot idf(t, D)$$

Where:
t denotes a term, also referred to herein as a keyword,
D denotes documents, including content objects and/or network documents,
N denotes number of documents, The tf data stored in dataset 1206 is used to dynamically compute the tf-idf, for a dynamic corpus of underlying data that is being updated (e.g., removed, added, changed).

The following exemplary process may be implemented for dynamically updating dataset 1206: The tf is computed for each content object for extraction of keywords. The tf dataset (i.e., 1206) may be dynamically updated based on the new identified keywords. During a calculation of the tf-idf, the idf is computed for the query (e.g., using the above mentioned equation) and combined with the computed tf extracted from dataset 1206 to computed the tf-idf.

Figure 13:
FIG. 13 is an exemplary tf table, in accordance with some embodiments of the present invention.

An exemplary tf table structure is depicted with reference to FIG. 13, which includes exemplary tf table 1302, in accordance with some embodiments of the present invention.

A search dataset 1208 for searching by a search engine using keywords. Search database 1208 stores indexed network documents and/or content objects in association with user credentials 1208A. Search database 1208 may be implemented as, for example, elastic search.

The personal user data may be indexed according to the following exemplary structure. Type: User reaction—network_document_name, —network_document_description, —network_document id, Number of reactions (e.g., positive), user id, —network_document category. Type: User content objects—user id, content object id, content object content.

A graph dataset 1210 for storing relationships between user credentials, network documents, and categories 1210A. Graph dataset 1210 may be implemented as a graph, for example, neo4J.

The personal data of users extracted from the social network may be stored in a graph data structure, where nodes may be one or more of: user credentials, network document, and category. Elements and relationships may be added as edges of the graph, for example: user → network document, network document → category, user → category. It is noted that in the graph data structure, categories may be designated as nodes and/or as relationships (i.e., edges of the graph). The number of user reactions (e.g., positive indications) may be designated as a weight of links of the graph. Relationships (e.g., edges) between users and categories may be defined for the graph.

Figure 14:
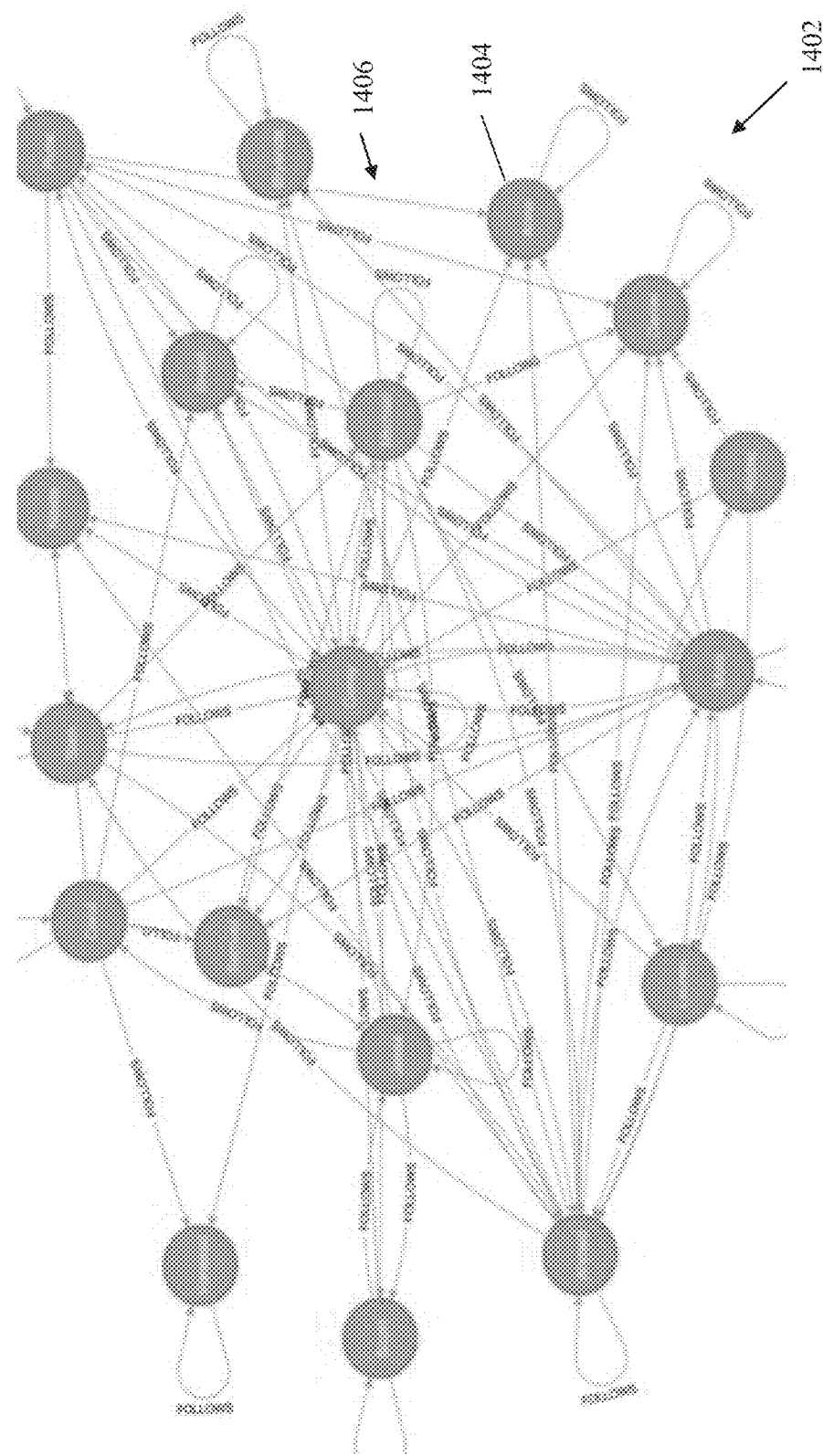
FIG. 14 is an example of a graph dataset storing relationships between users, in accordance with some embodiments of the invention.

Reference is now made to FIG. 14, which is an example of a graph dataset 1402 storing relationships between users, in accordance with some embodiments of the invention. Nodes (e.g., one node 1404 shown for clarity) store an indication of user credentials. Edges (e.g., one edge 1406 shown for clarity), optionally directed, store an indication of relationships between the user credentials.

At 306, one or more user categories are calculated. User categories may represent a high level of classification, encompassing multiple specific elements, for example, a genre. For example, a type of movie such as science fiction movies, a genre of a book such as a thriller.

The user categories are stored in the structured dataset in association with each user credential. The user categories may be used for structuring the unstructured data, for example, assigning a user category to user credentials and/or network documents and/or content objects. The user categories may be used for indexing the unstructured data.

Optionally, the categories are based on categories defined by the social network. Alternatively, the categories may be based on another categorization system, for example, as outputted by a trained statistical classifier. For example, network documents and/or content objects that are not mapped to any category and/or mapped to a category defined by the social network may be standardized to a common categorization system.

Optionally, each user is mapped into categories using the graph, for example, neo4j relations, through the network documents of the respective users, which may be connected to predefined categories (e.g., categories of the social network which may be mapped into a standardized set of categories).

User categories may be calculated based on normalization of weights. For example, computing a factor based on the percentage of each summed category (e.g., aggregated from the number of network documents for categories), with the sum of all users categories (e.g., aggregated from the number of all user network documents categories percentage). Using the computed factor, each summed user category is weighed by the uniqueness of the users to the respective category, taking in consideration the total sum and uniqueness of the category.

At 308, one or more user interests are calculated. User interests may represent a more specific type of element in comparison to the user category. For example, in a hierarchical structure, multiple types of user interests may be included in a single user category. For example, the user category is a science fiction movie, and the user interest is a specific movie and/or a subset of science fiction movies, for example, Star Wars.

The user interests are stored in the structured dataset in association with each user credential. The user interests may be used for structuring the unstructured data, for example, assigning a user interest to user credentials and/or network documents and/or content objects. The user interests may be used for indexing the unstructured data.

The user interests may be computed, for example, by a non-supervised approach, such as based on the K-means process. Topic modeling and/or keyword extraction of unsupervised dataset using feature extraction may be used.

The following is an exemplary process for computing user interests based on the non-supervised approach, optionally based on K-means:

1. Extracting network documents that are each linked to multiple user credentials. Optionally, an indication of the network document is extracted, for example, the name and/or title of the network document is extracted.
2. Vectorizing (e.g., using Count Vectorize) the extracted network documents indication (e.g., with limit max_features).
3. Kmeans algorithm is applied to the vectorized matrix.
4. K denoting the number of clusters, is defined as X (where X>the number of interests that are desired).
5. On each cluster, the feature closest to the center-id is selected.
6. By reversing the feature id using the vectorize vocabulary, the dominant feature name (e.g., token) of the cluster is obtained.
7. The token denotes the keyword representative of its respective cluster, and assigned to all points (i.e., network documents) within the respective cluster.
8. By re-matching ids, each interest (i.e., dominant cluster feature) is mapped to a network document (e.g., network document id). Each network document is mapped to one or more user credentials (e.g., by user-reaction relation), providing the user→interest relation.
9. The total number of reactions (e.g., positive user indications) of the network documents in each respective cluster are weighted with the number of points in the respective cluster, for computing a sorted score list (X=K). For target Y interests (X>Y) the top Y clustered scores are stored in the structured dataset as user interests. The others may be ignored.

It is noted that the method described above is a non traditional approach for keyword extraction of "forcing" the Kmean (i.e., the Kmean approach which is not designed for and/or not traditionally used for keyword extraction) to generate clusters (i.e., mostly focusing on arranging the document with relevant tokens). The center-ids represent the most relevant tokens of the corpus. The "noise" is reduced or eliminated from the documents by using the center-ids according to the above described method. Effectively, the Kmean based approach, as used in the above described process, may perform similarly to other standard keyword extraction and/or topic modeling methods. However, the above described method based on Kmeans improves computational efficiency of a computing device extracting keywords in comparison to traditional approaches. Moreover, the above described method may be implemented with smaller datasets than those used in traditional approaches, which reduces the data storage requirements (e.g., amount of memory) and/or further improves computational efficiency that arises by performing computations of the smaller dataset rather than the larger dataset used by other approaches.

As used herein, the term Kmeans is meant to be exemplary, and not necessarily limiting. Other non-supervised clustering approaches may be substituted for the Kmeans process.

Optionally, a statistical classifier is trained to perform the matching of the query to the structured dataset. Optionally, after assigning interests per user using the above mentioned (i.e., based on non-supervised clustering approaches, e.g., Kmeans), a new query (e.g., question) may be matched to an interest. The users mapped to the matched interest denote the matched user credentials to which the request for joining the interactive communication session is distributed, as described herein. For example, as defined by the following exemplary process: The interest extracted per network document is used to create a training set for statistical classifier, for example, a Naive Bayes classification process where: the features are defined as the vectorized network document tokens (as described herein), and the classification target is defined as the interest mapped to id (as described herein). Using the classified trained according to the supervised training set, the query is resolved into a one or more weighted interests. Optionally, the first statistical classifier is chained with another statistical classifier (e.g., another Naive Bayes model) that is trained according to training set storing: Features defined as interest percentages in user profiles, and the target defined as user_id. The output of the first query→interest classifier may be used as input into the interest→user classifier. The overall data flow is query→interest→user, providing the matched user credentials described herein to which the request for joining the interactive communication session is distributed, as described herein.

As used herein, the term Naïve Bayes is meant to be exemplary, and not necessarily limiting. Other statistical classifier approaches may be substituted for the Naïve Bayes classifier.

Figure 15:
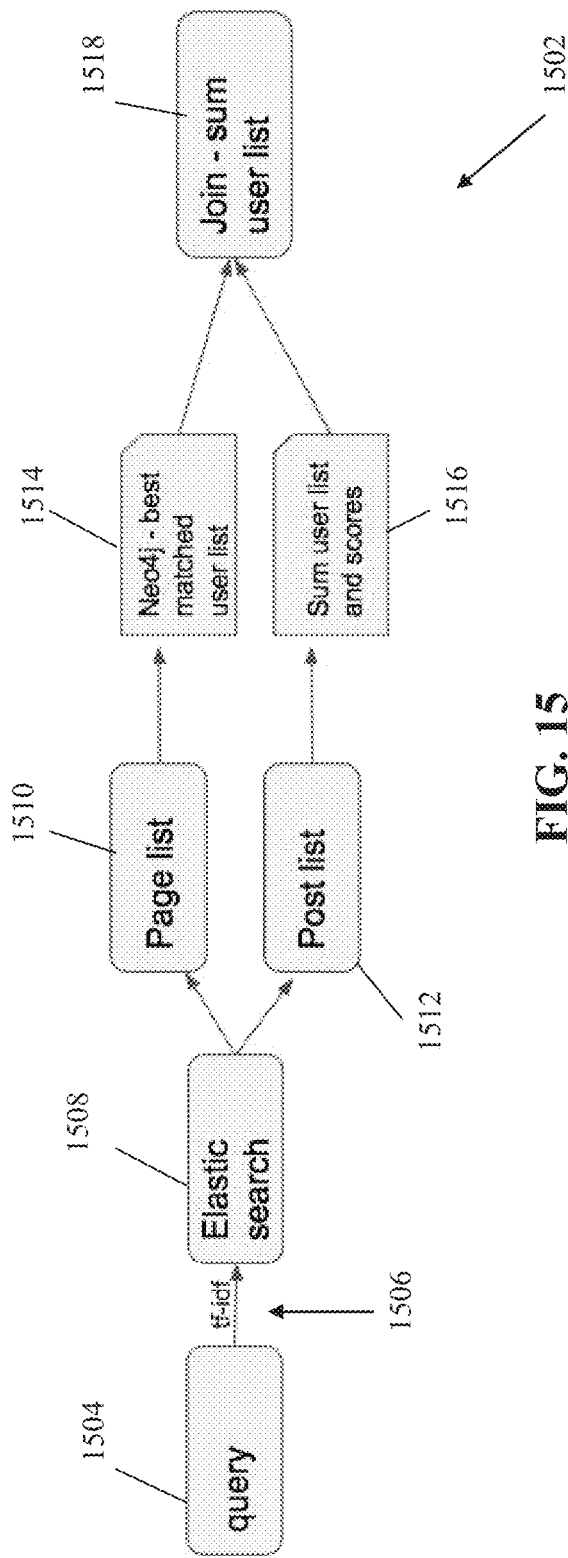
FIG. 15 is a schematic of an exemplary dataflow for selecting responding users for setting up an interactive communication session between responding client terminal(s) of the responding users and a querying client terminal of the querying user, in accordance with some embodiments of the present invention.
Figure 16:
FIG. 16 includes schematics depicting examples of intermediate search results executed for an example query, in accordance with some embodiments of the present invention.

Reference is now made to FIG. 15, which is a schematic of an exemplary dataflow 1502 for selecting responding users for setting up an interactive communication session between responding client terminal(s) of the responding users and a querying client terminal of the querying user, in accordance with some embodiments of the present invention. Features described with reference to FIG. 15 may correspond to features described with reference to FIG. 2 and/or FIG. 3. Features described with reference to FIG. 15 may be executed by components of system 100 described with reference to FIG. 1. Reference is also made to FIG. 16, which includes schematics depicting examples of intermediate search results executed for an example query, in accordance with some embodiments of the present invention. The intermediate search results may be presented in the GUI, and/or may not be presented on the GUI.

At 1504, a query is received, for example, as described with reference to act 204 of FIG. 2.

1602 of FIG. 16 is an example of a search query, optionally entered into the GUI. The example search query is "Who is the best guitar player?".

At 1506, the tf-idf is computed for the query, for example, as described with reference to act 204 of FIG. 2. Keywords of the query are identified, optionally based on the tf-idf, as described herein.

1604 of FIG. 16 depicts computational results of an analysis of each of the words of the query, to identify keywords for matching to the structured dataset. The query may be analyzed using tf-idf approaches, for example, based on the pre-indexed network documents and/or content objects, such as structured sub-dataset H06 described with reference to FIG. 12.

At 1508, a search is performed within the structured dataset using the tf-idf. 1606 of FIG. 16 depicts results of the analysis, in which the keywords identified from the query, guitar and player, are used for searching the structured dataset. The search may be performed by a search engine searching the structured dataset (e.g., the 1208 component described with reference to FIG. 12) using the keywords, for example, Elastic search.

A set of network documents 1510, and a set of content objects 1512 are identified as the results of searching the structured dataset using the keywords.

1608 of FIG. 16 is an example of the identified set of network documents 1510 returned as the results of searching the structured dataset using the keywords. A score is computed in association with each network document. The network documents may be ordered according to the scores. The search for network documents may be performed, for example, according to the network document titles and/or an "about" field and/or content object on the network document.

1610 of FIG. 16 is an example of the identified set of content objects 1512 returned as the results of searching the structured dataset using the keywords. A score is computed in association with each content object. The content objects may be ordered according to the scores. The search for content objects may be performed according to an Ngram method.

Network documents 1510 are analyzed using the graph to identify a best matched user credential list 1514. Optionally, best matched user credentials are identified by matching the network documents to corresponding user credentials and/or categories. The matching between the identified network documents and user credentials may be performed according to an analysis of the graph component of the structured dataset, for example, Neo4J.

1612 of FIG. 16 depicts a category matched for each of network documents 1510, optionally according to an analysis of the graph component of the structured dataset. The categories may be summed to result in a classifier.

Content objects 1512 are analyzed to compute scores for user credentials associated with the content objects 1516. The scores of the user credentials generated from the identified content objects may be normalized and/or ordered based on one or more parameters, for example, total number of content objects by the respective user credentials, and/or search result score indicative of match of the content object with the keyword(s).

Dataflow features 1506-1516 correspond to act 206 of FIG. 2.

1614 of FIG. 16 depicts a set of matched user credentials 1518 created from an aggregation (e.g., merging) of the best matched user credential list 1514 and the scores of the user credentials associated with the content objects 1516. The combined list of user credentials may be ordered and/or normalized.

A subset of the matched user credentials may be selected, for example, as the matched user credentials associated with highest scores, for example, according to a requirement, such as the top predefined number of user credentials, and/or the user credentials above a threshold score.

Optionally, a weighted score is computed for each user credential based on one or more additional parameters, optionally a correlation between a user profile of the querying user and the user profile(s) of the matched user credentials, as described herein. The matched user credentials may be adjusted according to the weighted score.

Optionally, matching may be further performed according to user profiles, as described herein.

Acts 210-214 of FIG. 2 are executed using the matched user credentials 1518, as described herein.

Referring now back to FIG. 3, at 310, terms of the unstructured user generated content stored in the structured dataset are standardized. The standardization of the terms identifies a common term for terms that are similar, have similar meanings, are variations of one another, and/or are synonyms. The standardization of the terms improves the accuracy and/or computational efficiency of matching keywords to data stored in the structured dataset when terms of the dataset are normalized, and the keywords are based on the normalized terms used in the structured dataset.

The semantic matching is performed by matching words of the query to standardized terms mapped to user generated content.

An exemplary process for standardizing terms of the unstructured user generated content is now described. A set of document-tokens matched to the unstructured user generated content is generated. The document-tokens may be according to text of the unstructured user generated content, for example, title, "about" field, or other indications of the content. The document-tokens are clustered into a plurality of clusters. The clusterization may be performed based on non-supervised processes, for example, based on the Kmeans process described herein. For each respective cluster, a single unstructured user generated content indicative as most representative of the members of the respective cluster is selected. For example, the content closest to the centroid of the respective cluster. A term of the selected single unstructured user generated content is designated as a standardized term. Each member of each respective cluster is mapped to the corresponding standardized term of the respective cluster.

At 312, one or more of acts 302-310 are iterated, for dynamically updating the structured dataset. The iterations add data of new users to the structured dataset, and/or update the structured dataset according to adaptations of existing data of the social network. Examples of adaptations of existing data of the social network include, for example, adding of new data objects and/or network documents by existing user credentials, deletion of posted data objects and/or network documents, changing wording of existing data objects and/or network documents, new user reactions to data objects and/or network documents, removal of user reactions to data objects and/or network documents, and changing the value of existing user reactions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant social networks and interactive communication sessions will be developed and the scope of the terms social networks and interactive communication sessions are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicates number and a second indicates number and "ranging/ranges from" a first indicates number "to" a second indicates number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of setting up an interactive communication session between a querying client terminal and at least one target client terminal, comprising:
    creating a structured data set storing structured data by:
        extracting a set of user generated unstructured content from posted profiles of a plurality of user credentials of a social network;
        wherein each user generated unstructured content is mapped to at least one user credentials by user reactions to the user generated unstructured content;
        clustering the set of user generated unstructured content into a plurality of clusters, wherein each cluster comprises a subset of the set of user generated unstructured content;
        for each respective cluster of the plurality of clusters,
            (i) identifying a respective feature closest to a cluster center, the respective feature denoting a respective user interest of the respective cluster,
            (ii) assigning the respective user interest to each user generated unstructured content of the respective cluster, and
            (iii) computing a respective score for the respective cluster based on a total number of user reactions to the subset of user generated unstructured content of the respective cluster weighted with a total number of user generated unstructured content in the subset of user generated unstructured content of respective cluster;
        ranking the plurality of clusters according to respective scores;
        for each user generated unstructured content of each of a top number of ranked clusters, indexing each respective user generated unstructured content with the assigned respective user interest to create a respective structured data associated with indexed user interests; storing each respective structured data associated with indexed user interests in the structured dataset;
    receiving a query from the querying client terminal;
    analyzing the query to identify at least one user interest of the query;
    semantically matching the query to a structured data by matching the at least one user interest of the query to indexed user interests stored in the structured dataset, to obtain a matched structured data;
    selecting a plurality of matched user credentials of users of the social network according to an analysis of the matched structured data;
    distributing a request for joining an interactive communication session to a plurality of matched client terminals of the plurality of matched user credentials;
    receiving at least one response to the request from at least one responding client terminal of at least one responding user credentials; and
    establishing an interactive communication session between the querying client terminal and the at least one responding client terminal of the at least one responding user credentials.

2. The method of claim 1, wherein a plurality of responses to the request are received from a corresponding plurality of responding client terminals, wherein establishing comprises establishing a single interactive communication session between the plurality of responding client terminals and the querying client terminal.

3. The method of claim 1, wherein a plurality of responses to the request are received from a corresponding plurality of responding client terminals, wherein establishing comprising establishing a plurality of one-on-one interactive communication sessions, each between the querying client terminal and one of the plurality of responding client terminals.

4. The method of claim 1, further comprising creating a group interactive session by adding the at least one responding client terminal and the querying client terminal as participants to the group interactive session.

5. The method of claim 1, further comprising identifying an existing group interactive session having the at least one responding client terminal as a participant thereof, and establishing the interactive communication session comprises adding the querying client terminal as a participant of the existing group interactive session.

6. The method of claim 1, wherein no social relationships exist in the social network between querying user credentials associated with the query and the at least one responding user credentials.

7. The method of claim 1, wherein the structured dataset stores an indication of each respective user that generated each user generated unstructured content.

8. The method of claim 1, further comprising updating the structured dataset with structured data created from user generated unstructured content posted by the querying client terminal and the at least one responding user credentials to the interactive communication session.

9. The method of claim 1, wherein the query is associated with querying user credentials, and further comprising updating the structured dataset with structured data created by indexing with the at least one user interest of the query, unstructured content generated by the querying user credentials and user reactions to the user generated unstructured content of the querying user credentials, wherein the unstructured content and user reactions to the user generated unstructured content are extracted from at least one posted profile of the querying user credentials of the social network.

10. The method of claim 1, further comprising updating the structured data set with structured data created from an analysis of interactions of the querying client terminal and the at least one responding user credentials with the interactive communication session.

11. The method of claim 10, wherein the analysis of the interactions include: number of posts during the interactive communication session, number of words posted during the interactive communication session, number of interactive communication sessions in which a respective user credential that provided the query from the querying client terminal participated in, total time spent participating in the interactive communication session, and a reaction by the querying client terminal to the at least one responding user credentials indicative of response to the query.

12. The method of claim 1, wherein the user reactions to the user generated unstructured content include one or more members selected from a group consisting of: a reaction of a certain user to a network document associated with reactions by a plurality of users, a reaction of the certain user to a content object generated by another user, and a reaction of another user to at least one of a network document of the certain user and a content object generated by the certain user.

13. The method of claim 1, further comprising:
analyzing the query to select at least one keyword based on an analysis of computed word scores assigned to each of a plurality of words of the query,
wherein the word scores are assigned to each of the plurality of words of the query according to an analysis of a structured word index created from the set of user generated unstructured content; and
wherein semantically matching comprises semantically matching the at least one keyword to the structured dataset.

14. The method according to claim 13, wherein semantically matching comprises:
searching indexed user generated content of the structured dataset with the at least one keyword to identify a plurality of matching structured indexed user generated content objects, wherein the indexed user generated content of the structured dataset is created by indexing of the set of user generated unstructured content,
wherein the plurality of matched user credentials are selected according to the plurality of matching structured indexed user generated content objects.

15. The method according to claim 14, wherein the plurality of matched user credentials are selected by mapping the plurality of matching structured indexed user generated content objects to the plurality of matched user credentials according to a mapping dataset of the structured dataset, wherein the mapping dataset is created according to an analysis of the set of user generated unstructured content, and user reactions to the set of user generated unstructured content.

16. The method according to claim 15, wherein the plurality of matched user credentials are selected according to a score computed for each of a plurality of candidate user credentials, the plurality of candidate user credentials are mapped to the plurality of matching structured indexed user generated content objects, where each score is indicative of correlation between a respective candidate user credentials of the plurality of candidate user credentials and the at least one keyword, the score computed according to an analysis of the mapping dataset.

17. The method according to claim 15, wherein the mapping dataset comprises a graph comprising nodes and edges connecting the nodes, wherein the nodes are indicative of at least one member selected from a group consisting of: indexed network document of user generated content objects, indexed user generated content objects, user credentials, and a category, wherein edges connecting the nodes are selected from a group consisting of: a link between user credentials and an indexed network document of user generated content objects, a link between user credentials and indexed user generated content objects, a link between an indexed network document of user generated content objects and a category, and a link between a user credential and a category, wherein each indexed network document is linked to a plurality of user credentials, wherein each indexed user generated content object is linked to a single user credential, wherein user reactions to the set of user generated unstructured content are stored as weights of the edges.

18. The method according to claim 1, wherein the plurality of matched user credentials are further selected according to a correlation score computed based on a correlation between a user profile of a querying user that provided the query and a user profile of each of the plurality of matched user credentials.

19. The method according to claim 18, wherein the user profile includes one or more members selected from a group consisting of: demographic data, age, income, education level, geographical location, preferred time of day, and indication of relationships between a respective user and other users.

20. The method according to claim 1, wherein the structured dataset includes a categorization of the set of user generated unstructured content into a plurality of categories, wherein each user generated unstructured content comprises a network document linked to user credentials via user reactions to the user generated unstructured content, each category of the plurality of categories being associated with a computed category uniqueness score indicative of uniqueness of the user credentials to the respective category and the uniqueness of the respective category relative to the plurality of categories.

21. The method according to claim 20, wherein the analysis of the matched structured data for selecting the plurality of matched user credentials is according to the uniqueness score of the category of the matched structured data and according to a match with a category computed for the query.

22. The method according to claim 1, wherein semantically matching comprises semantically matching words of the query to the structured dataset according to a standardization of terms of the set of user generated unstructured content.

23. The method according to claim 22, wherein the standardization of terms of the set of user generated unstructured content comprises:
generating a set of document-tokens matched to the set of user generated unstructured content;
clustering the document-tokens into a plurality of clusters;
selecting, for each respective cluster of the plurality of clusters, a single user generated unstructured content indicative as most representative of members of the respective cluster, wherein a term of the selected single user generated unstructured content is designated as a standardized term; and
wherein each member of each respective cluster is mapped to the corresponding standardized term of the respective cluster, and the semantically matching is performed by matching words of the query to standardized terms mapped to user generated content.

24. The method according to claim 23, wherein the clusterization is performed based on non-supervised processes.

25. The method of claim 1, wherein the query is entered into a graphical user interface (GUI), and interactions of the interactive communication session are presented within the GUI.

26. The method according to claim 1, wherein the interactive communication session comprises a chat messaging session.

27. The method according to claim 1, wherein the query is text manually entered by a user.

28. The method of claim 1, further comprising:
associating unstructured data obtained from the interactive communication session with the at least one user interest of the query to create new structured data indexed with the at least one user interest of the query; and
updating the structured dataset with the new structured data indexed with the at least one user interest of the query.

29. The method of claim 1, wherein the clustering the set of user generated unstructured content is performed by a k-means non-supervised approach.

30. The method of claim 1, further comprising vectoring an indication of the set of user generated unstructured content to create a plurality of vectors, wherein the clustering is performed on the plurality of vectors, wherein the respective feature closest to the cluster center is reversed using a vectorized vocabulary of the indication of plurality of vectors to identify the respective user interest.

31. The method of claim 1, wherein a target number of the plurality of clusters is greater than a number of target user interests.

32. The method of claim 1, wherein analyzing the query to identify at least one user interest of the query comprises inputting the query into a statistical classifier that generates an outcome of the at least one user interest, wherein additional data indicative of activity or engagement extracted according to an analysis of the interactive communication session is used as target rewards during training of the statistical classifier.

33. The method of claim 1, wherein semantically matching the query to the structured dataset comprises searching the indexed user interests of the structured dataset with the at least one user interest of the query to identify matching structured indexed user generated content object created by indexing of the set of user generated unstructured content, by a search engine that searches indexed data in response to keywords.

34. The method of claim 1, wherein no direct social relationship exists in the social network between user credentials associated with the querying client terminal and the at least one responding user credentials associated with the at least one responding client terminal participating in the interactive communication session.

35. A system for setting up an interactive communication session between a querying client terminal and at least one target client terminal, comprising:
at least one hardware processor; and
a non-transitory memory having stored thereon a code for execution by the at least one hardware processor, the code comprising instructions for:
creating a structured dataset storing structured data by:
extracting a set of user generated unstructured content from posted profiles of a plurality of user credentials of a social network;
wherein each user generated unstructured content is mapped to at least one user credentials by user reactions to the user generated unstructured content;
clustering the set of user generated unstructured content into a plurality of clusters, wherein each cluster comprises a subset of the set of user generated unstructured content;
for each respective cluster of the plurality of clusters,
(i) identifying a respective feature closest to a cluster center, the respective feature denoting a respective user interest of the respective cluster,
(ii) assigning the respective user interest to each user generated unstructured content of the respective cluster, and
(iii) computing a respective score for the respective cluster based on a total number of user reactions to the subset of user generated unstructured content of the respective cluster weighted with a total number of user generated unstructured content in the subset of user generated unstructured content of respective cluster;
ranking the plurality of clusters according to respective scores;
for each user generated unstructured content of each of a top number of ranked clusters, indexing each respective user generated unstructured content with the assigned respective user interest to create a respective structured data associated with indexed user interests; storing each respective structured data associated with indexed user interests in the structured dataset;
receiving a query from the querying client terminal;
analyzing the query to identify at least one user interest of the query;
semantically matching the query to a structured data by matching the at least one user interest of the query to indexed user interests stored in the structured dataset, to obtain a matched structured data;
selecting a plurality of matched user credentials of users of the social network according to an analysis of the matched structured data;
distributing a request for joining an interactive communication session to a plurality of matched client terminals of the plurality of matched user credentials;
receiving at least one response to the request from at least one responding client terminal of at least one responding user credentials; and
establishing an interactive communication session between the querying client terminal and the at least one responding client terminal of the at least one responding user credentials.

36. A computer program product for setting up an interactive communication session between a querying client terminal and at least one target client terminal, comprising:
a non-transitory memory having stored thereon a code for execution by at least one hardware processor, the code comprising instructions for:
creating a structured dataset storing structured data by:
extracting a set of user generated unstructured content from posted profiles of a plurality of user credentials of a social network;
wherein each user generated unstructured content is mapped to at least one user credentials by user reactions to the user generated unstructured content;
clustering the set of user generated unstructured content into a plurality of clusters, wherein each cluster comprises a subset of the set of user generated unstructured content;

for each respective cluster of the plurality of clusters,
- (i) identifying a respective feature closest to a cluster center, the respective feature denoting a respective user interest of the respective cluster,
- (ii) assigning the respective user interest to each user generated unstructured content of the respective cluster, and
- (iii) computing a respective score for the respective cluster based on a total number of user reactions to the subset of user generated unstructured content of the respective cluster weighted with a total number of user generated unstructured content in the subset of user generated unstructured content of respective cluster;

ranking the plurality of clusters according to respective scores;

for each user generated unstructured content of each of a top number of ranked clusters, indexing each respective user generated unstructured content with the assigned respective user interest to create a respective structured data associated with indexed user interests; storing each respective structured data associated with indexed user interests in the structured dataset;

receiving a query from the querying client terminal;

analyzing the query to identify at least one user interest of the query;

semantically matching the query to a structured data by matching the at least one user interest of the query to indexed user interests stored in the structured dataset, to obtain a matched structured data;

selecting a plurality of matched user credentials of users of the social network according to an analysis of the matched structured data;

distributing a request for joining an interactive communication session to a plurality of matched client terminals of the plurality of matched user credentials;

receiving at least one response to the request from at least one responding client terminal of at least one responding user credentials; and establishing an interactive communication session between the querying client terminal and the at least one responding client terminal of the at least one responding user credentials.

* * * * *